Figure 1:
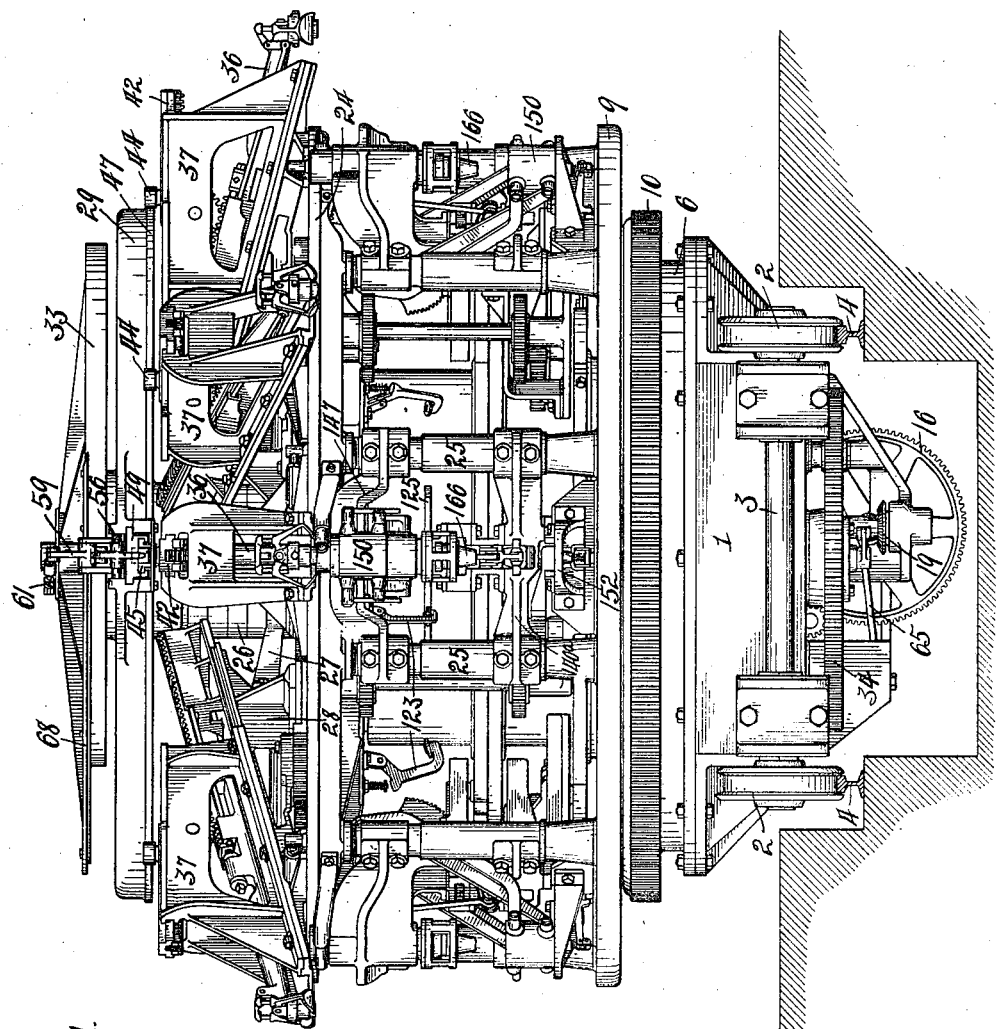

J. W. ROBINSON.
GLASS WORKING MACHINE.
APPLICATION FILED APR. 17, 1914.

1,147,892.

Patented July 27, 1915.
22 SHEETS—SHEET 1.

WITNESSES:-

INVENTOR.
Joseph W Robinson,
By Owen, Owen & Crampton,
His attys.

J. W. ROBINSON.
GLASS WORKING MACHINE.
APPLICATION FILED APR. 17, 1914.

1,147,892.

Patented July 27, 1915.
22 SHEETS—SHEET 3.

WITNESSES:-
R. G. Allen.
E. E. Thomas.

INVENTOR.
Joseph W. Robinson.
By Owen, Owen & Crampton,
His attys.

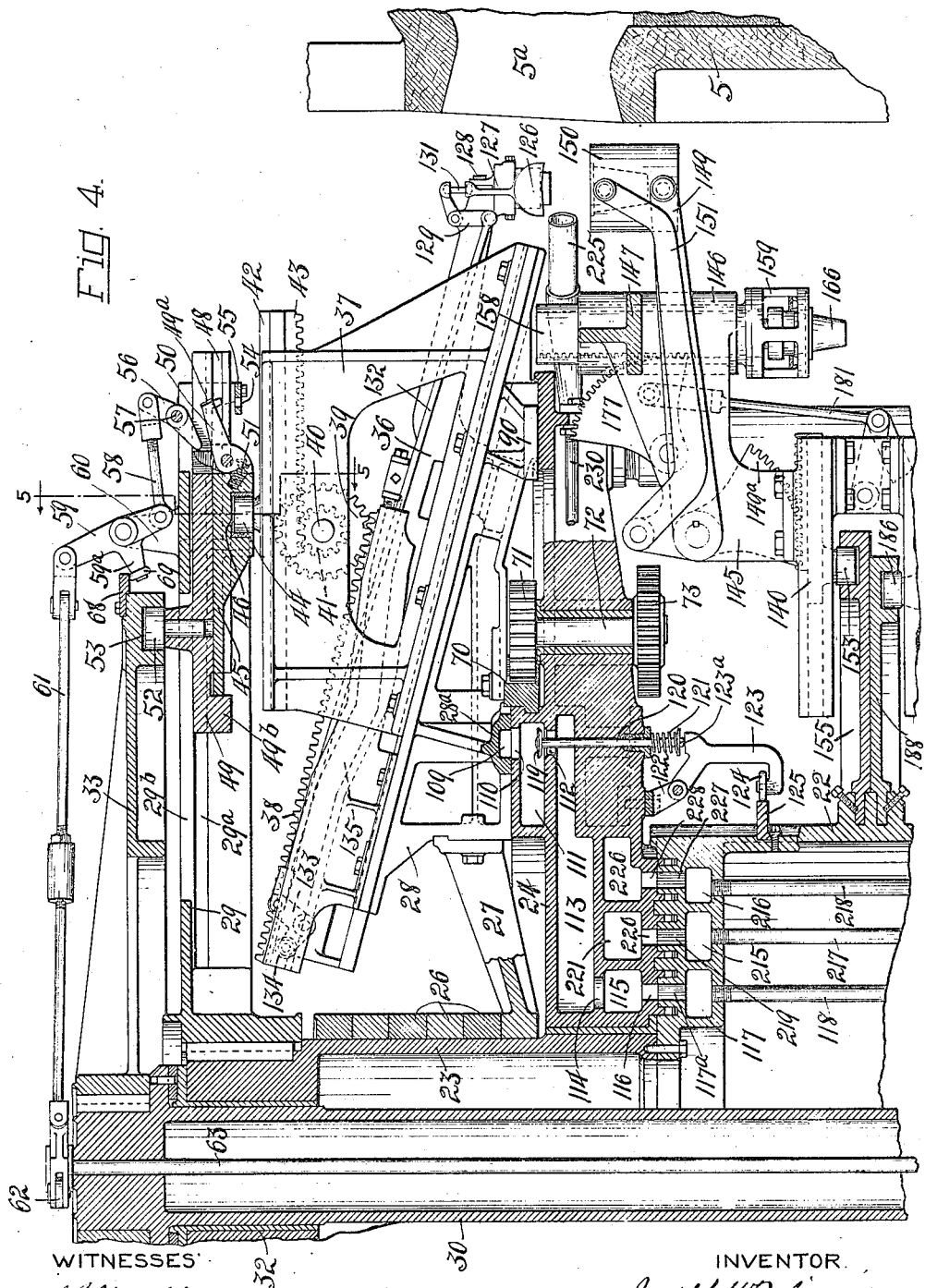

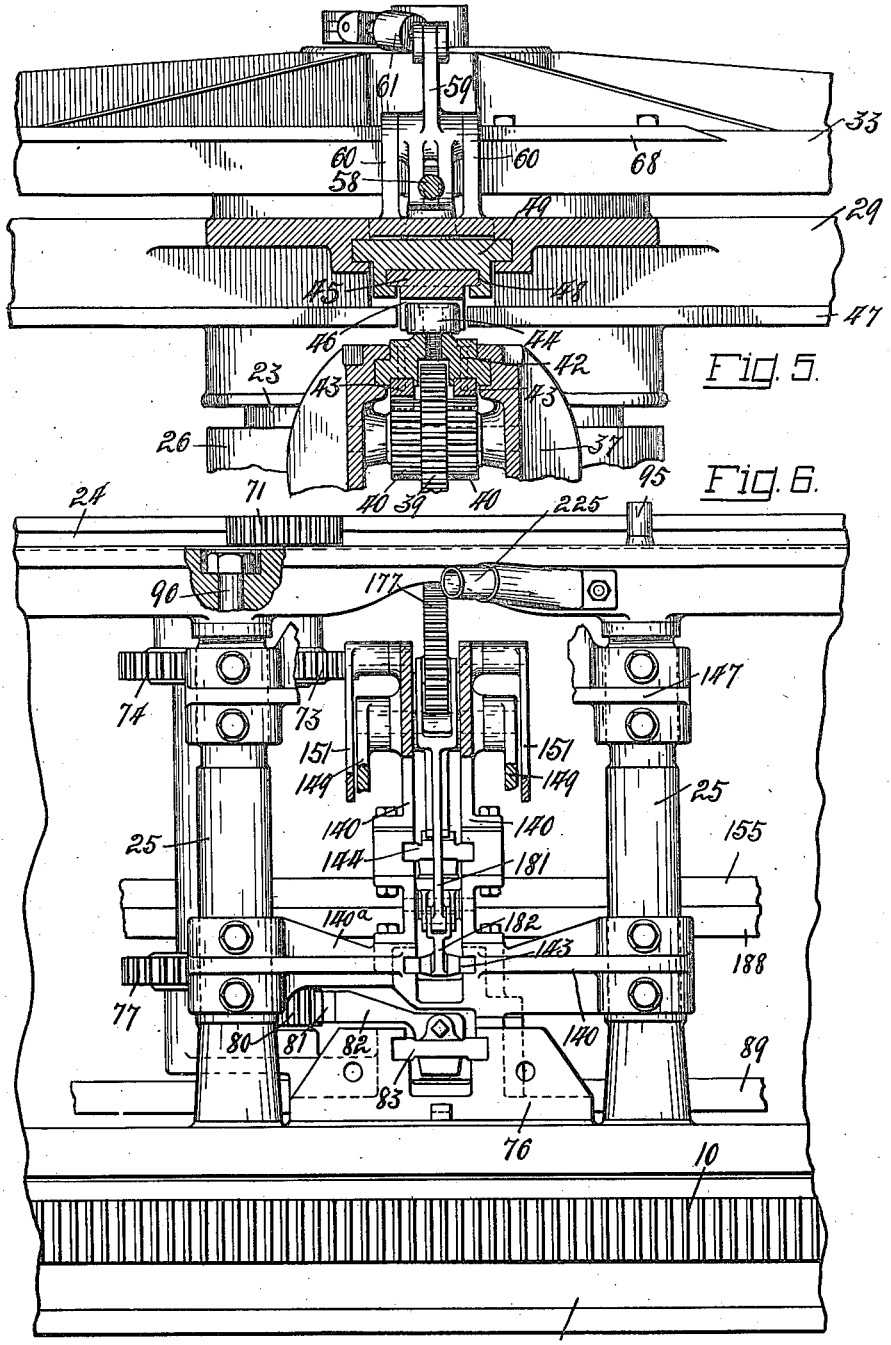

J. W. ROBINSON.
GLASS WORKING MACHINE.
APPLICATION FILED APR. 17, 1914.
1,147,892.
Patented July 27, 1915.
22 SHEETS—SHEET 6.
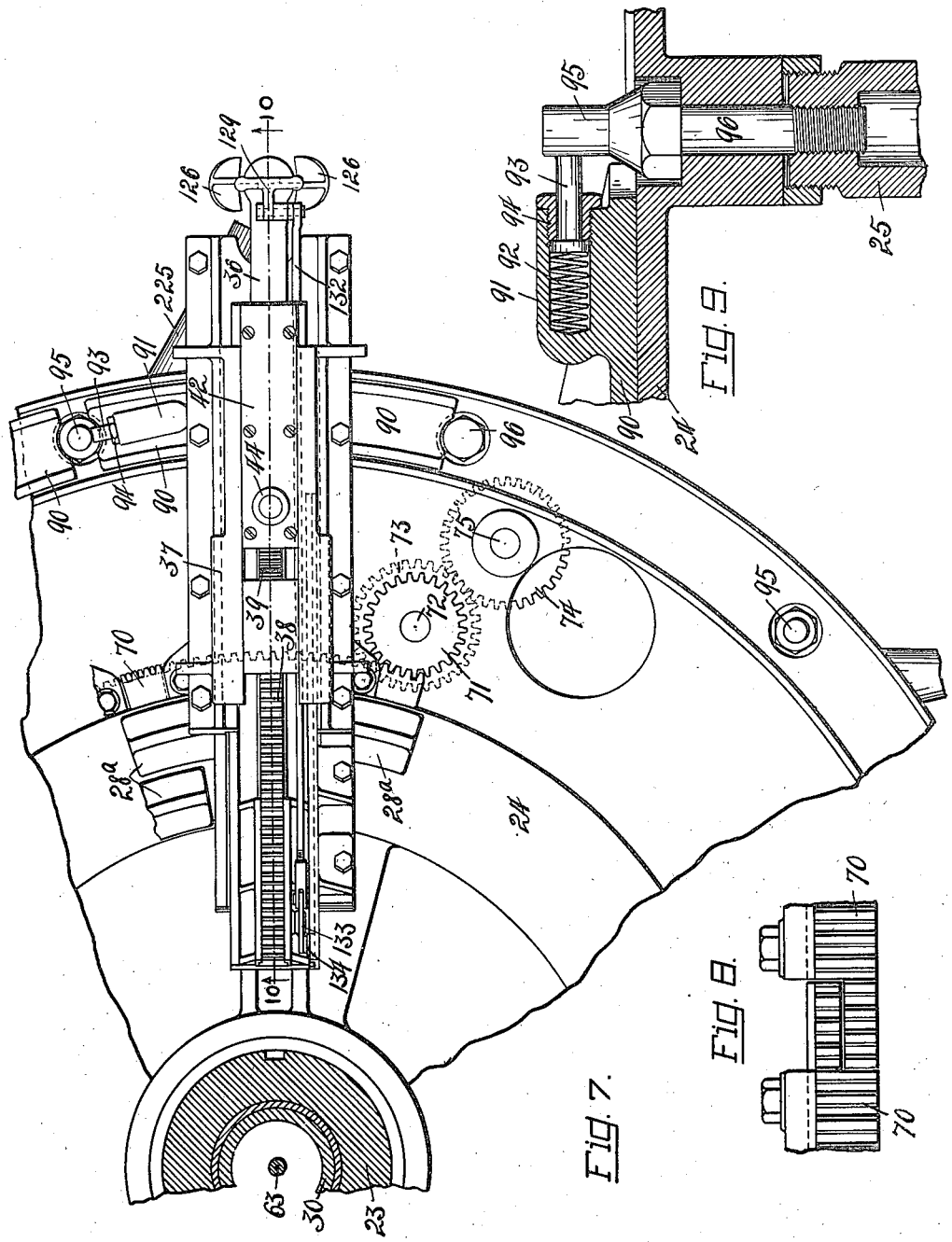
WITNESSES:—
INVENTOR.

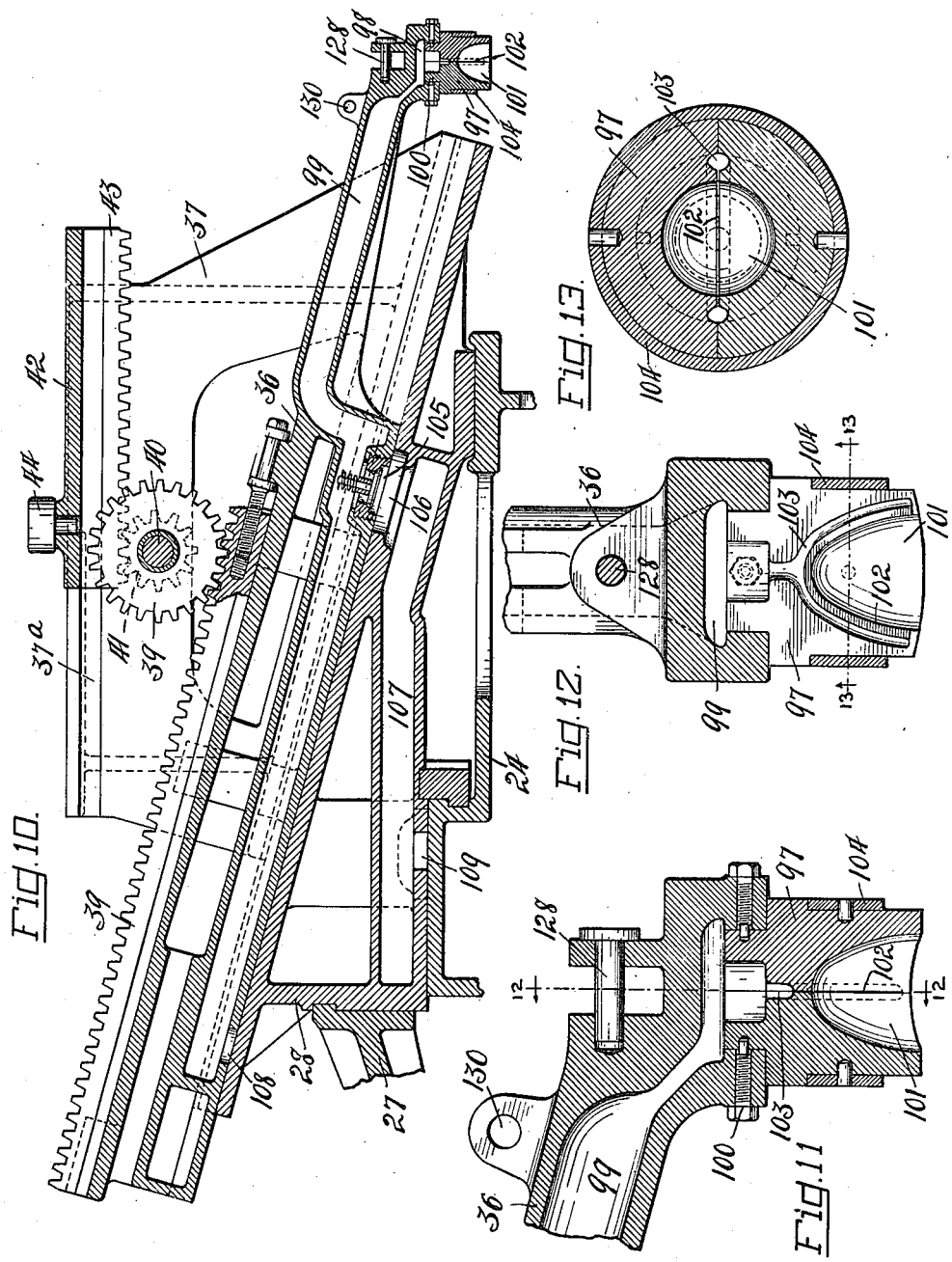

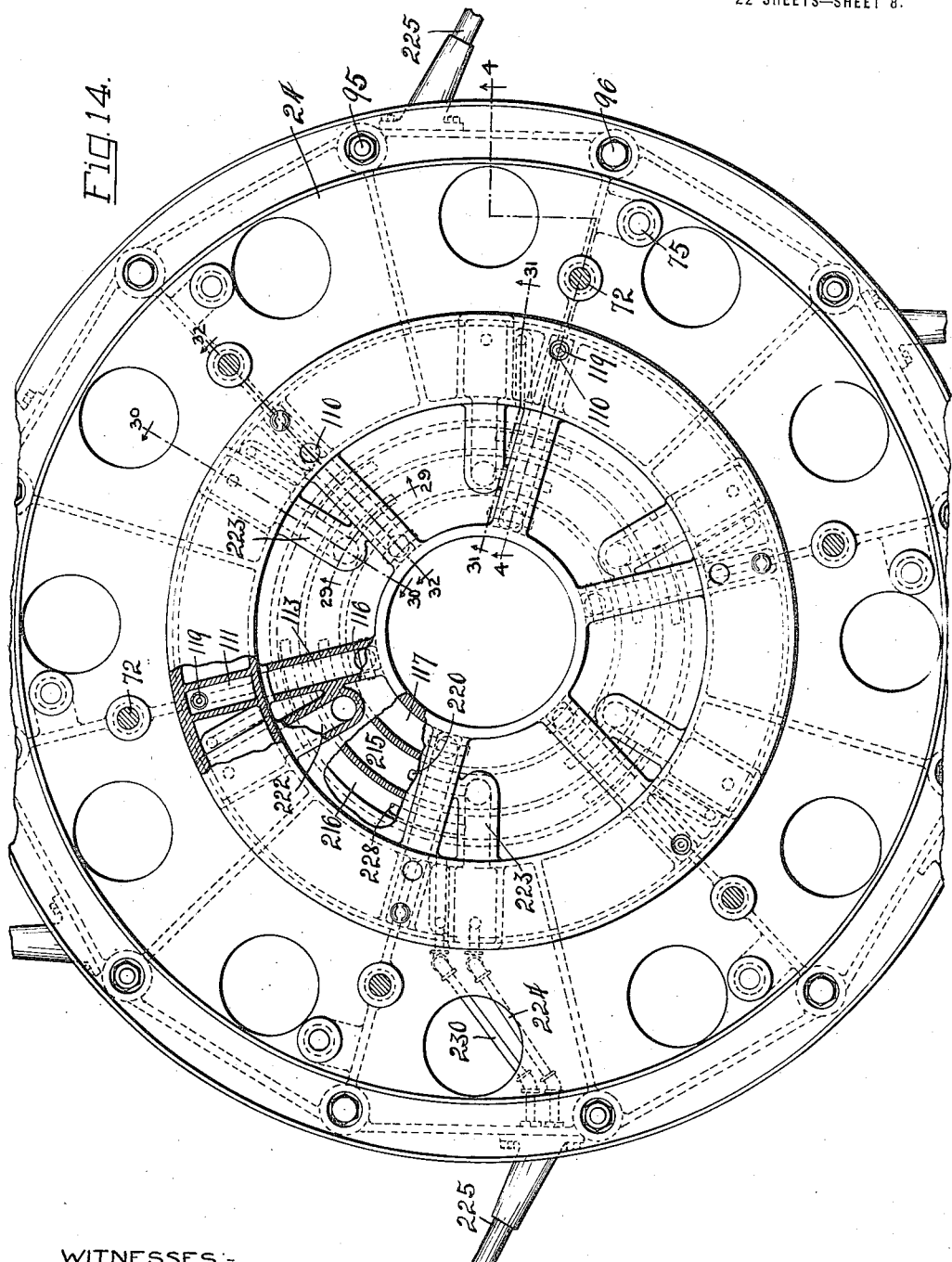

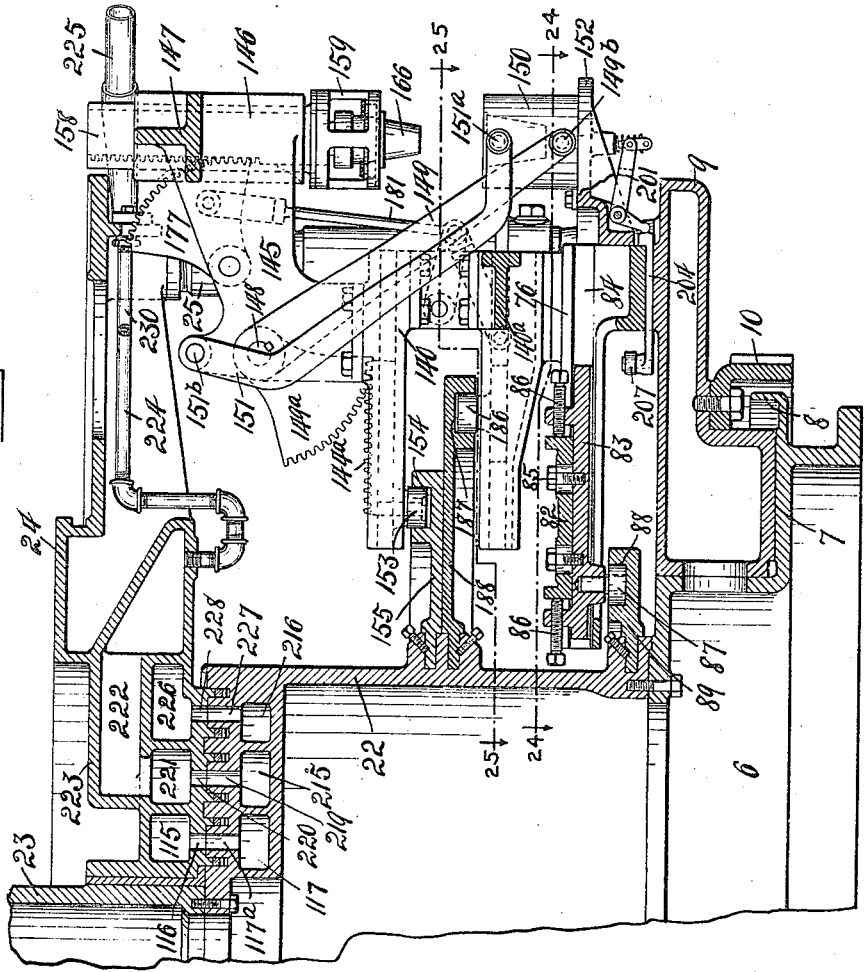

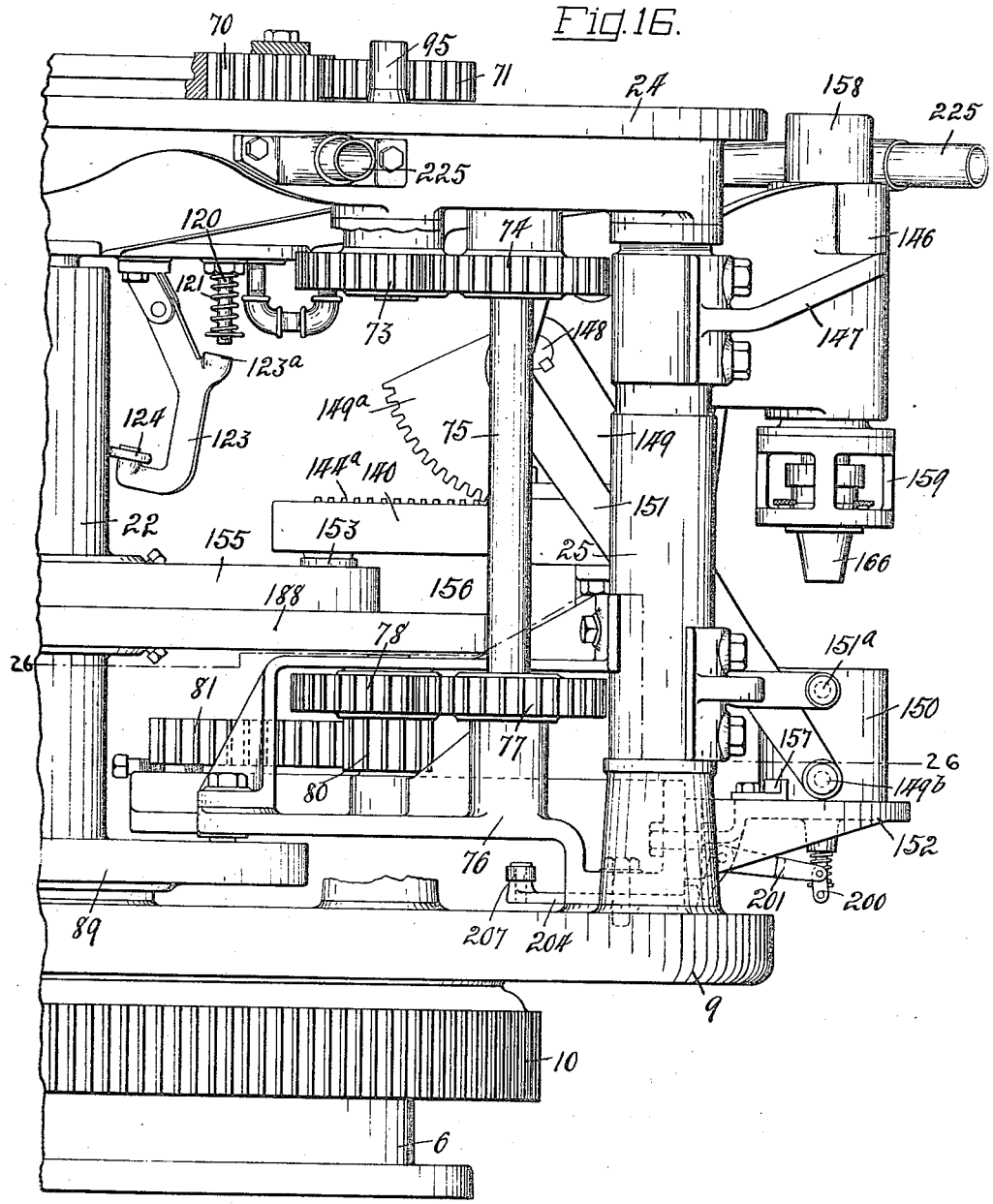

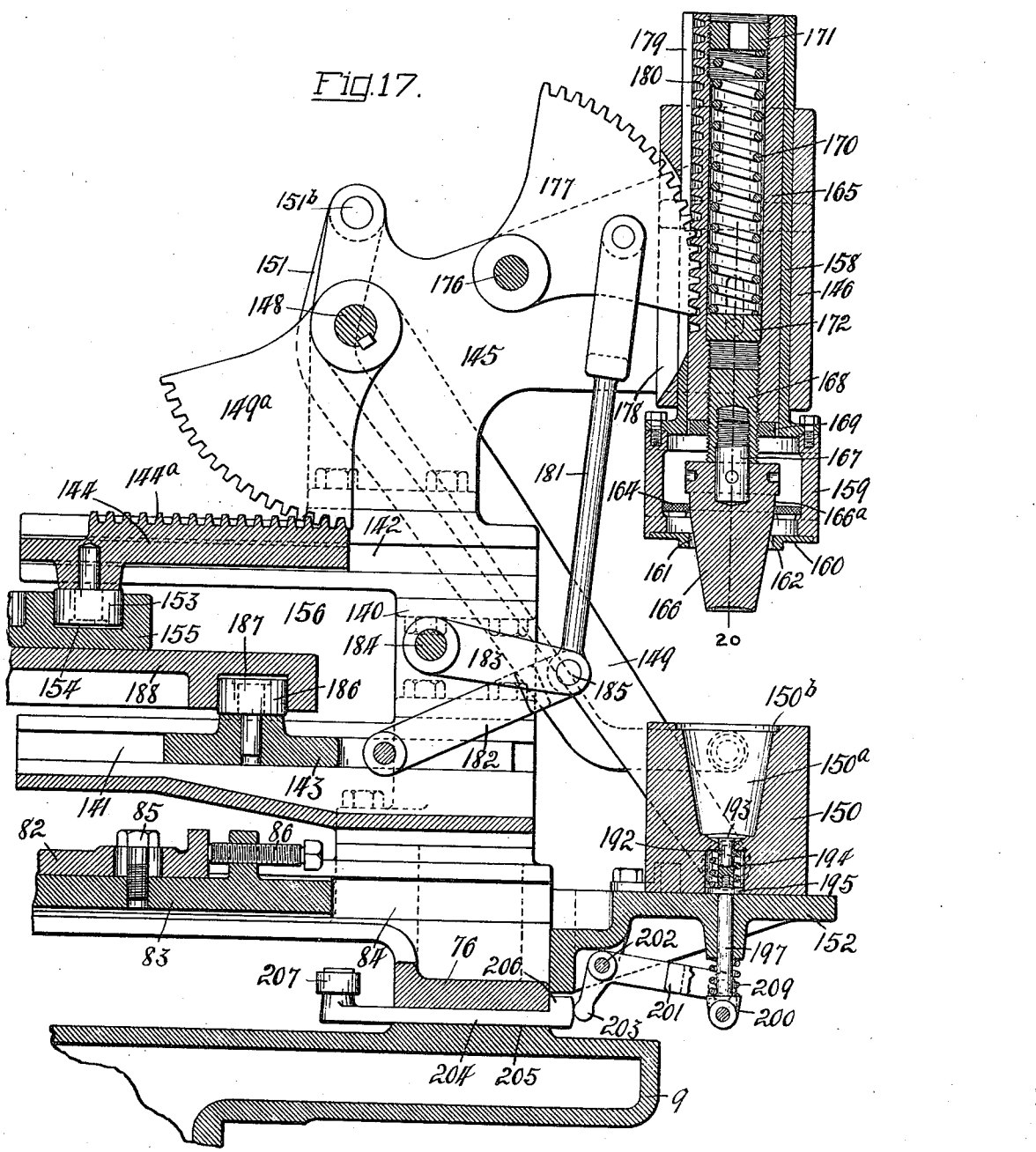

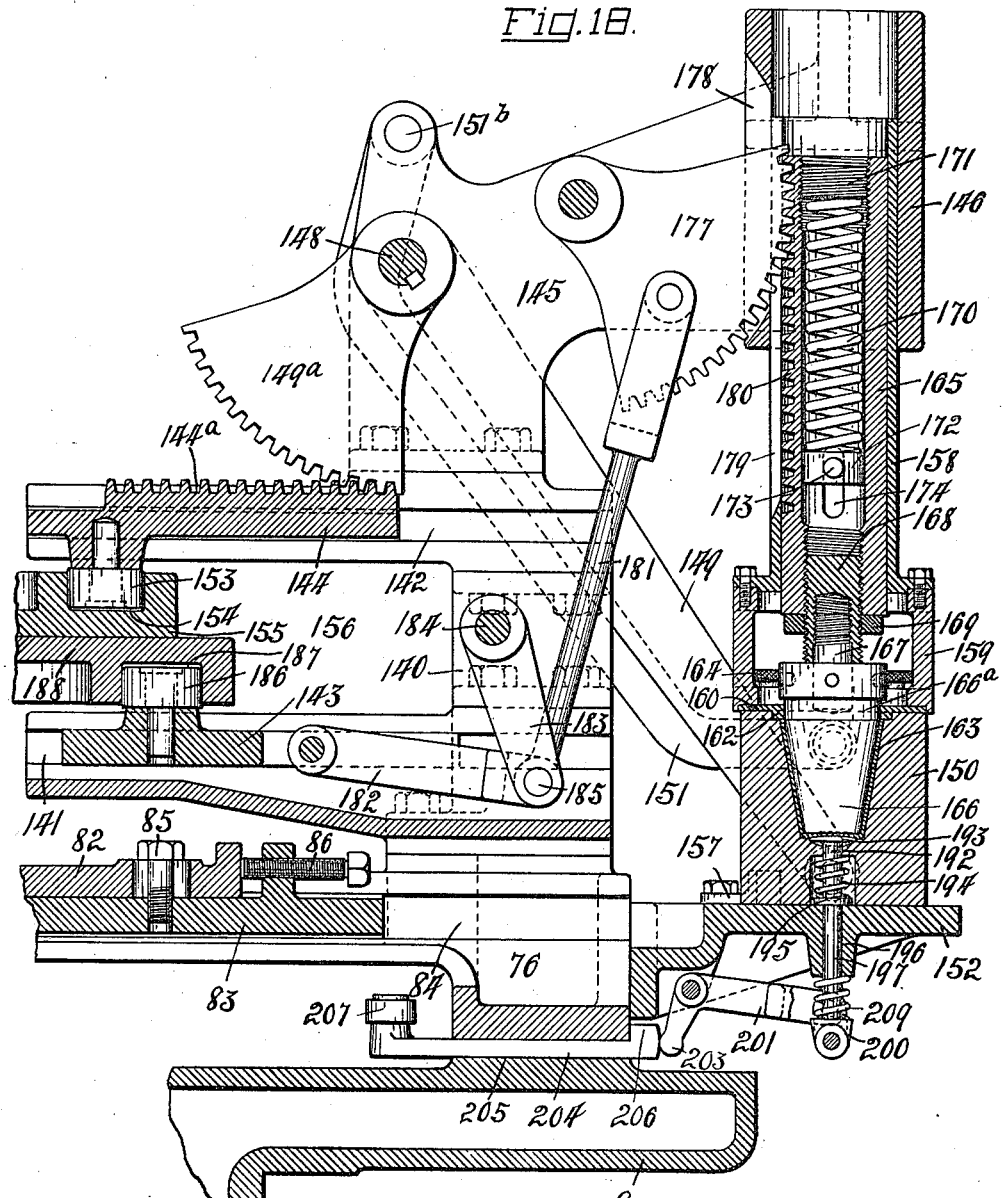

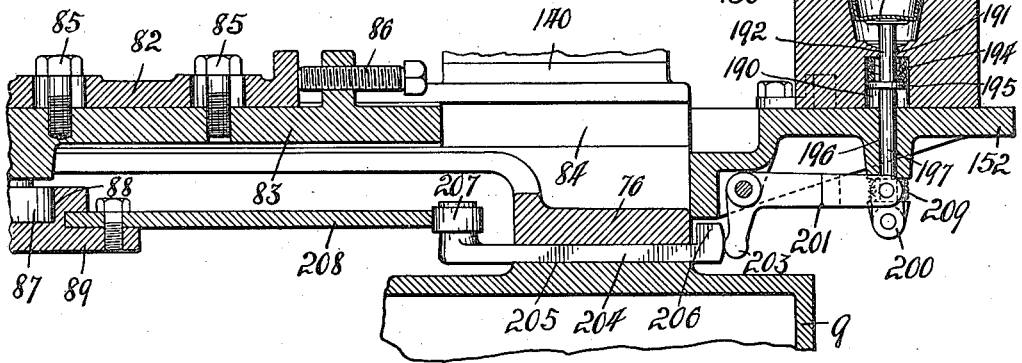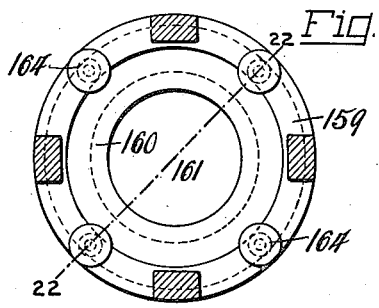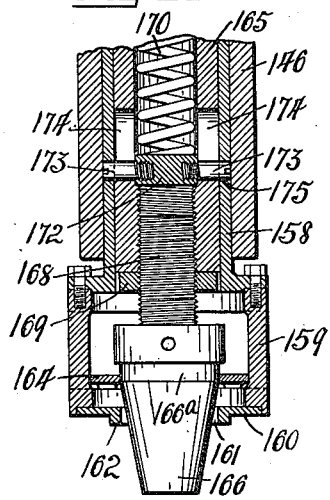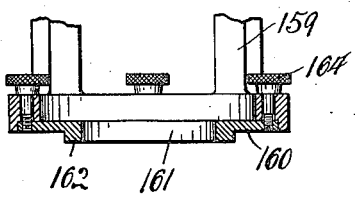

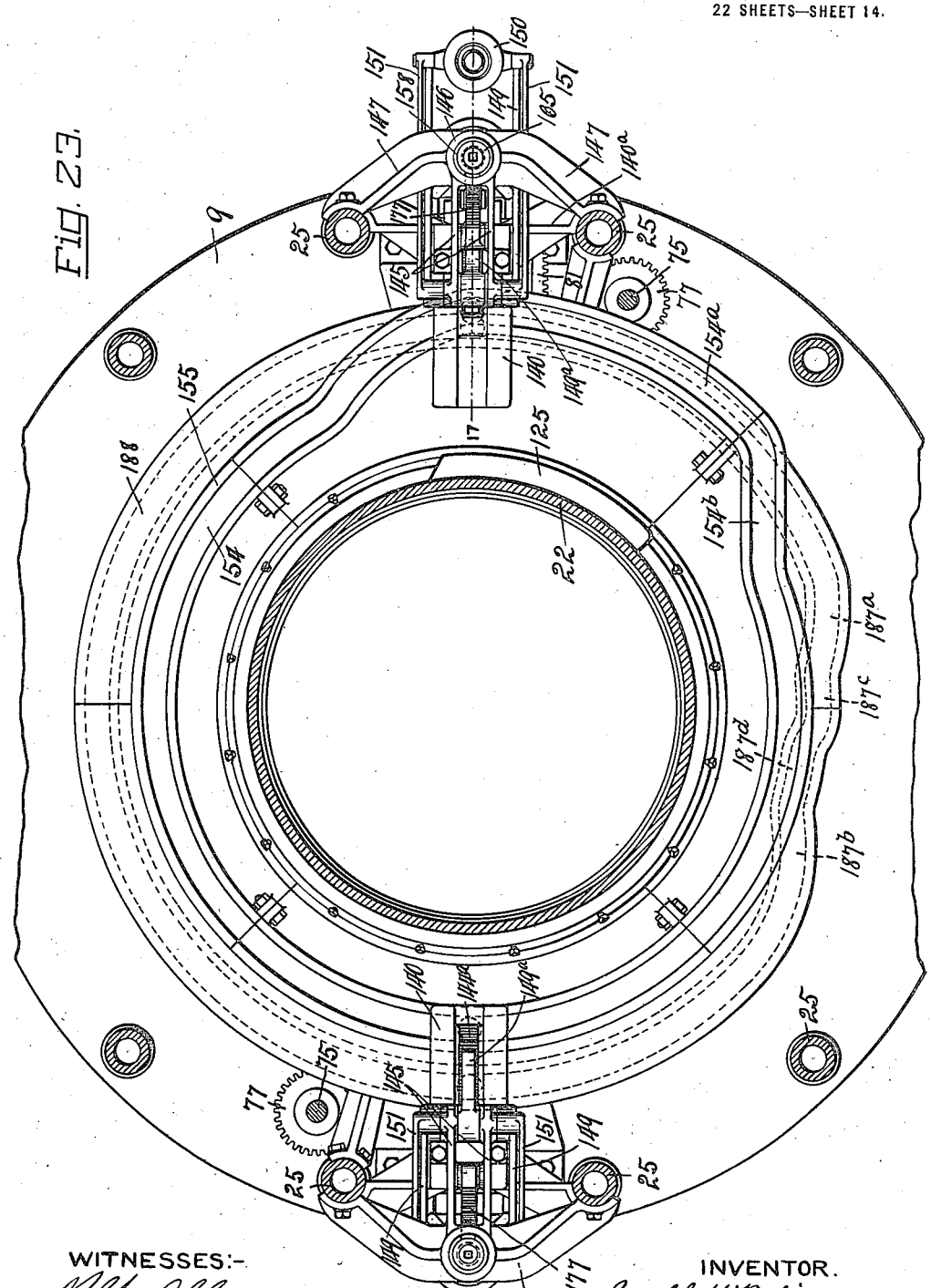

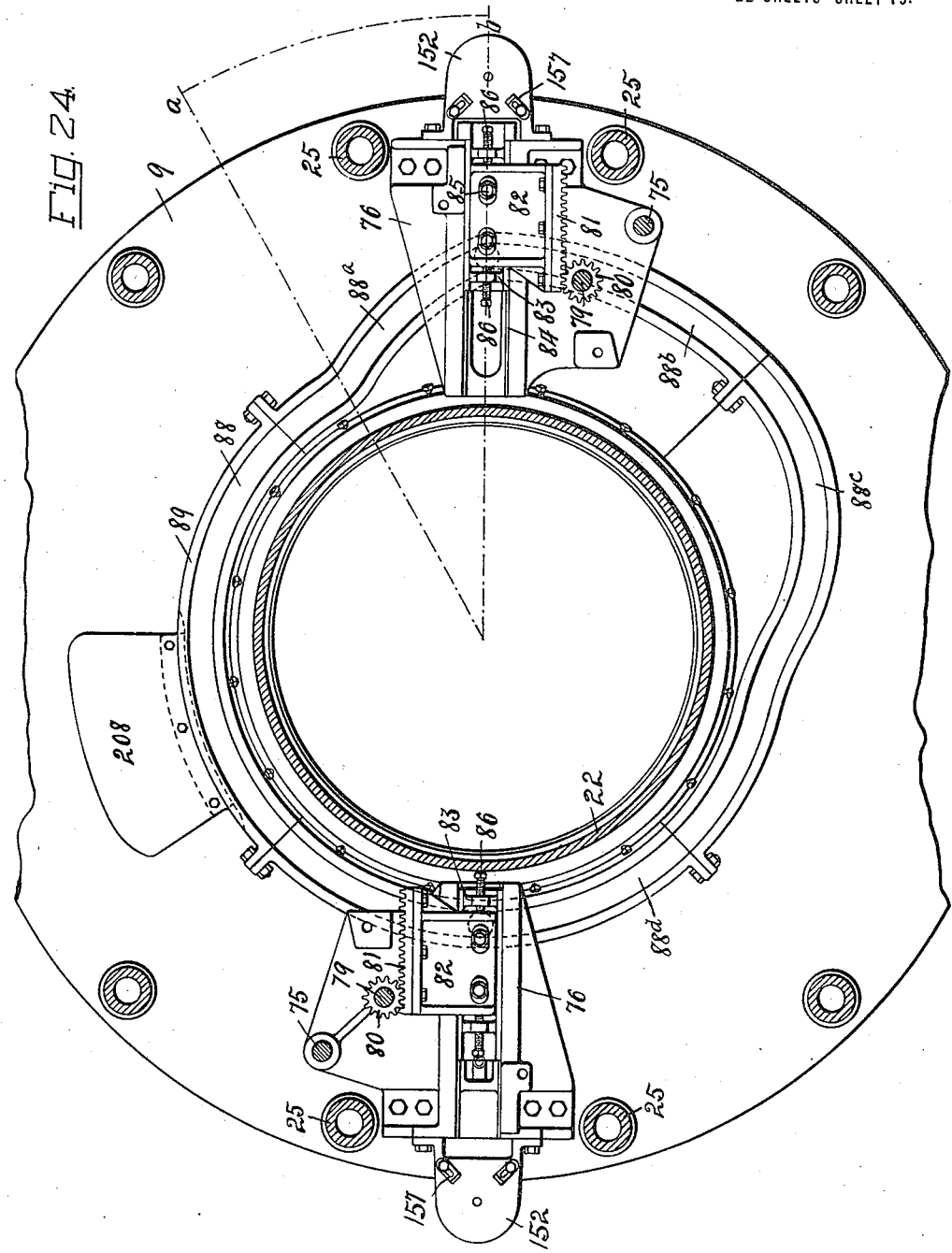

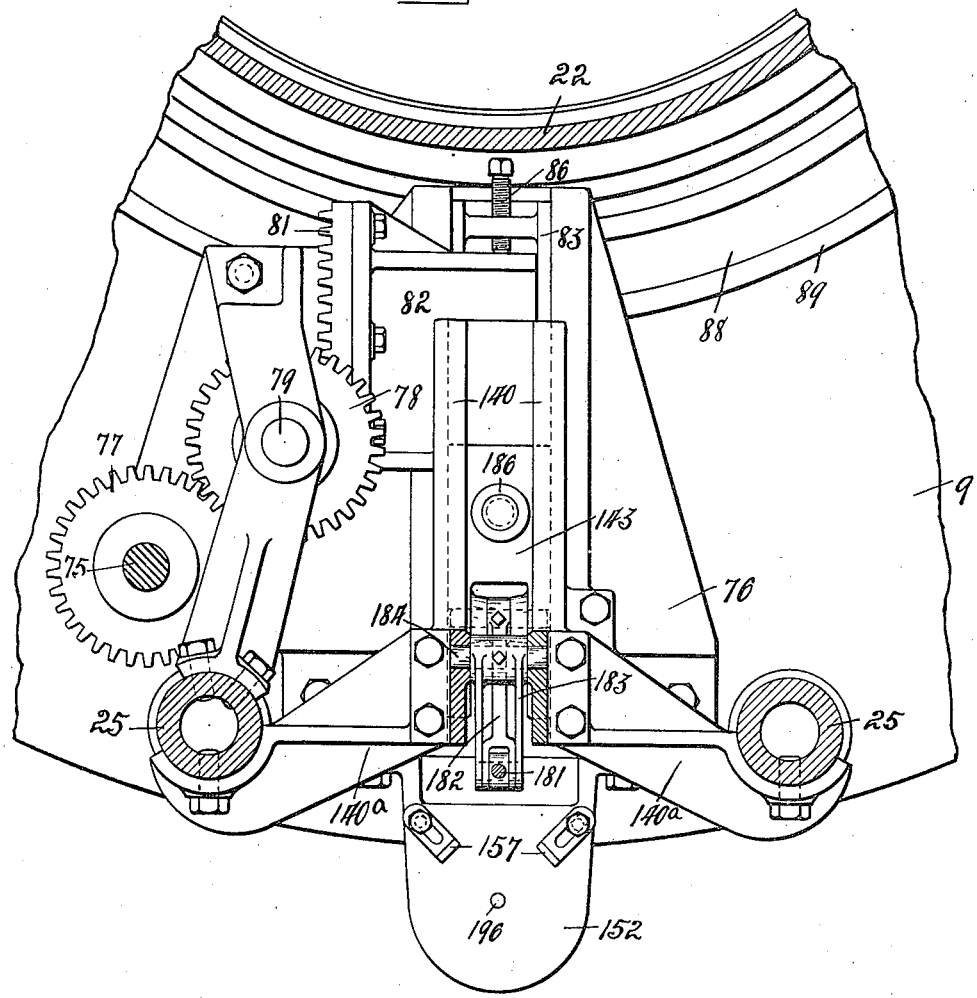

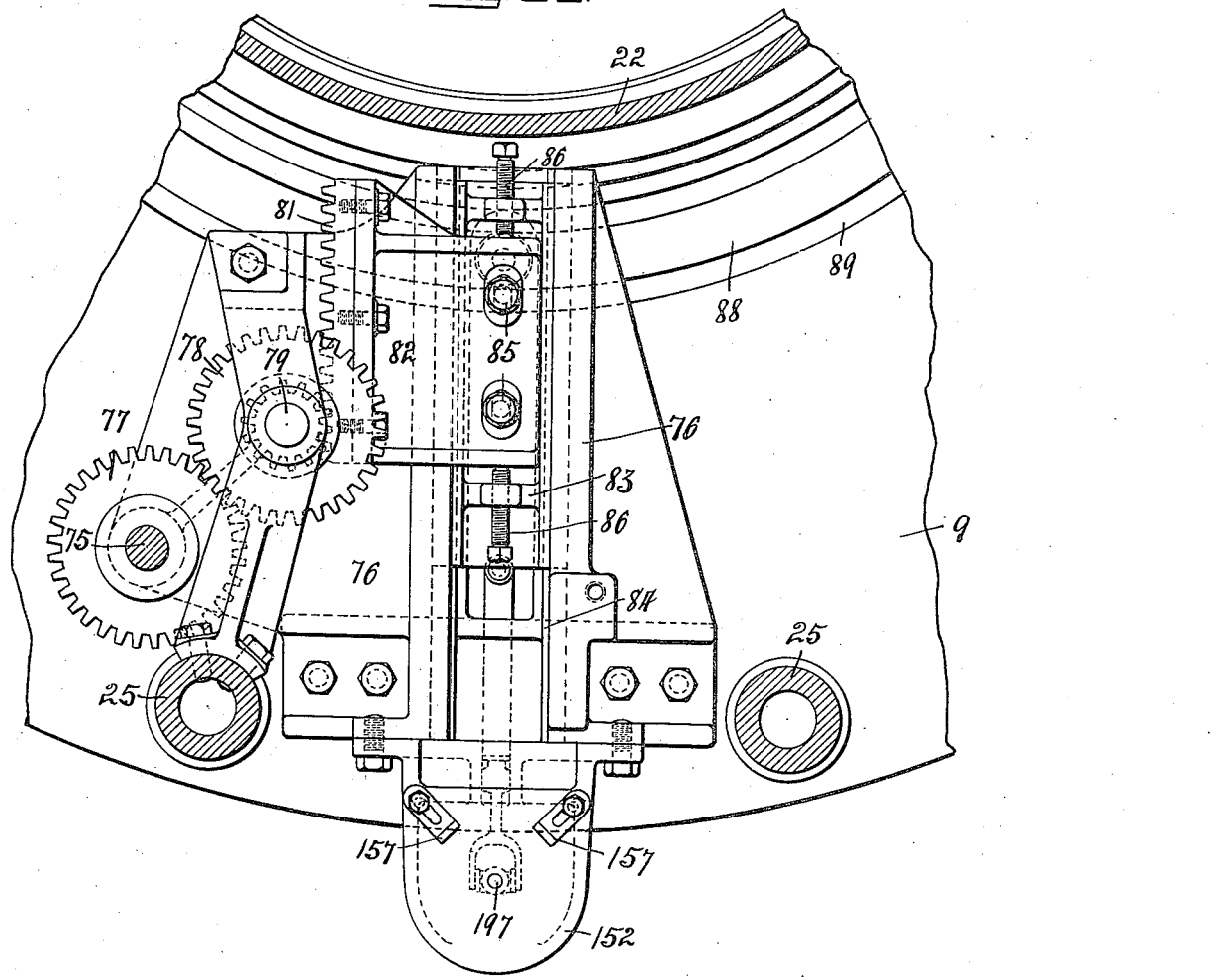

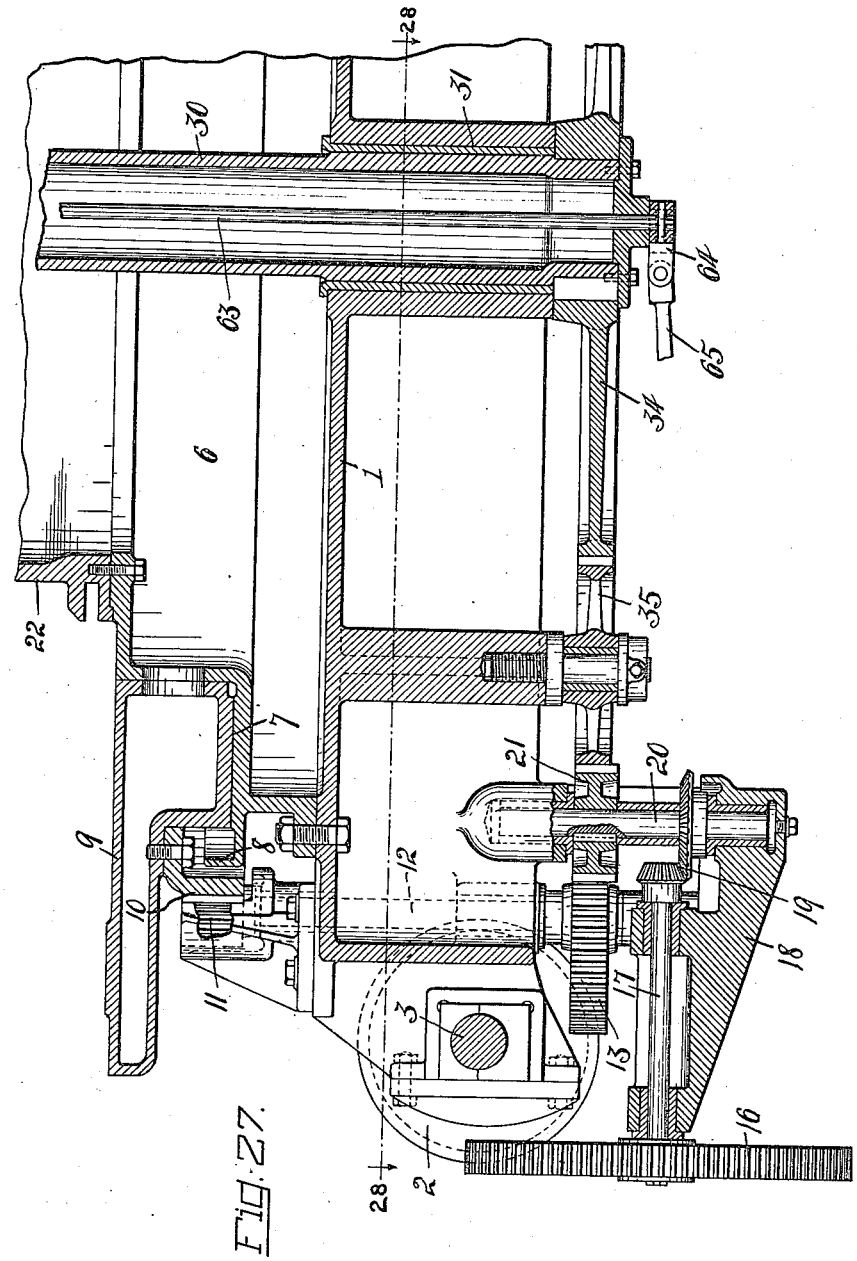

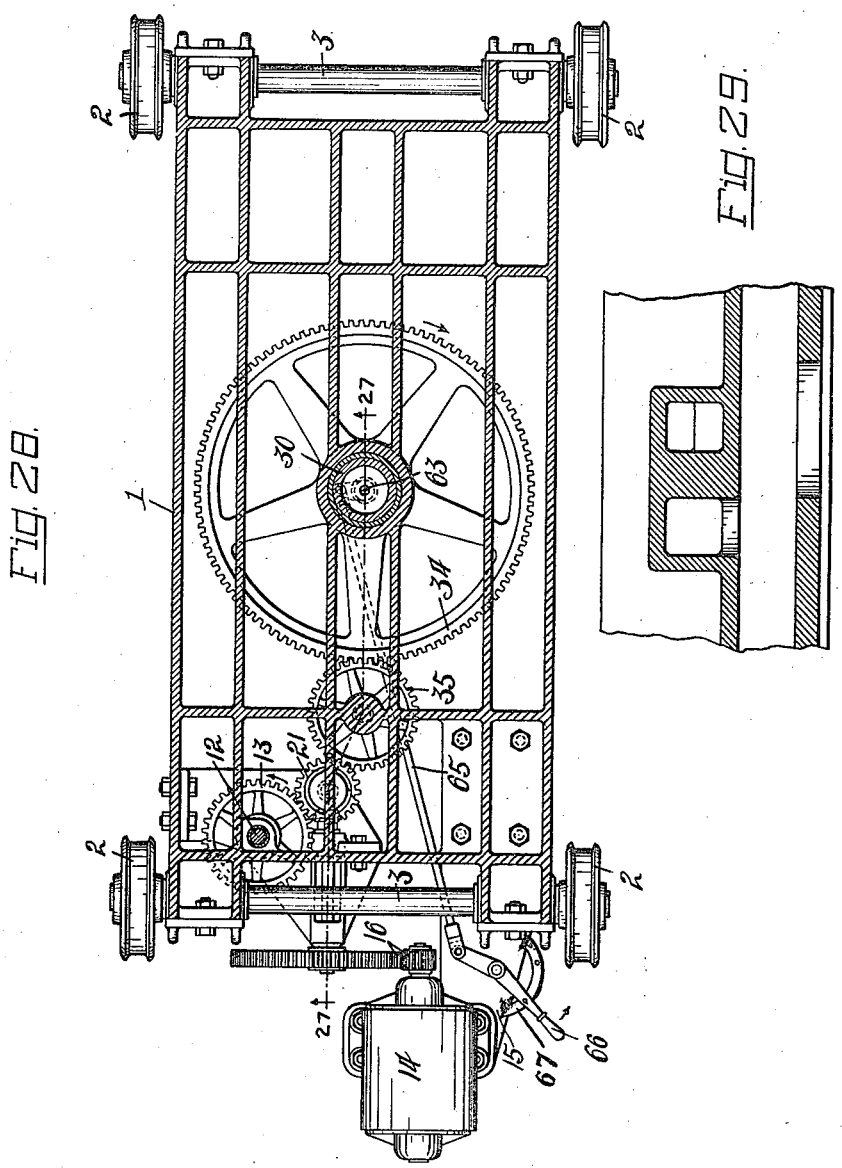

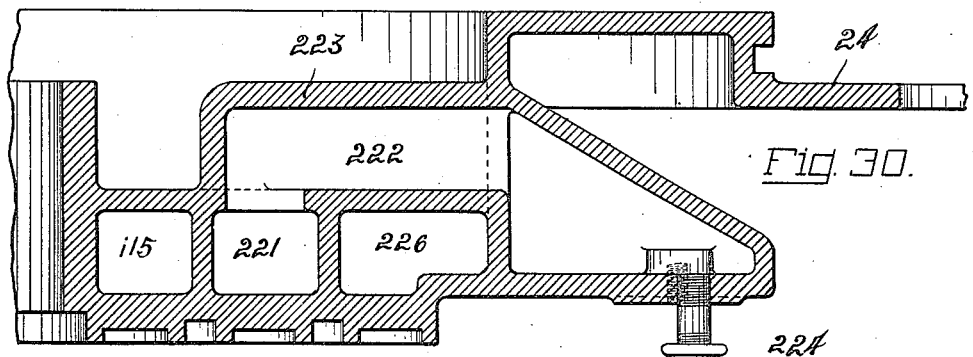
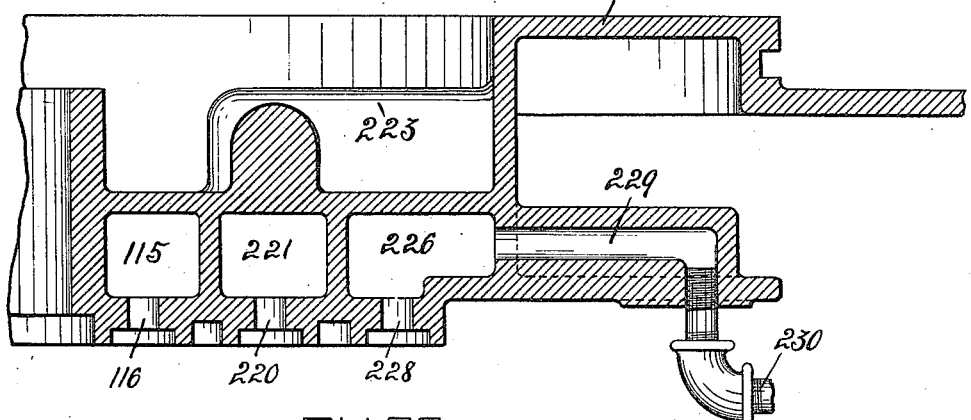
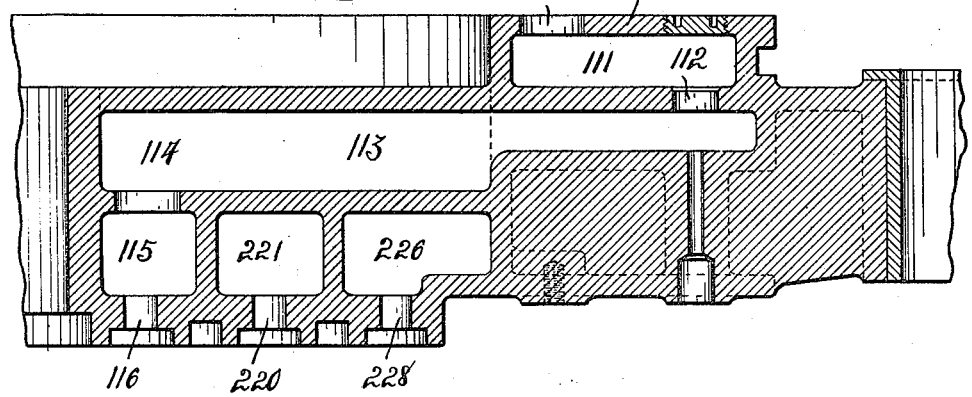

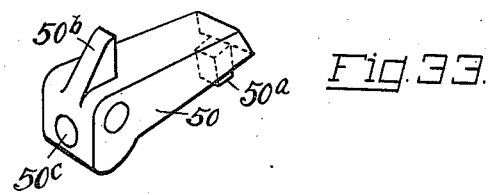
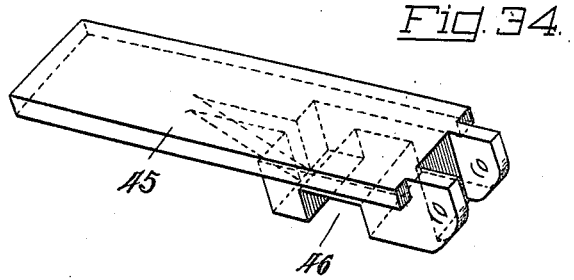
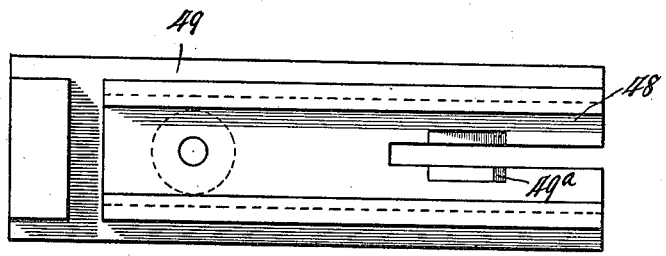

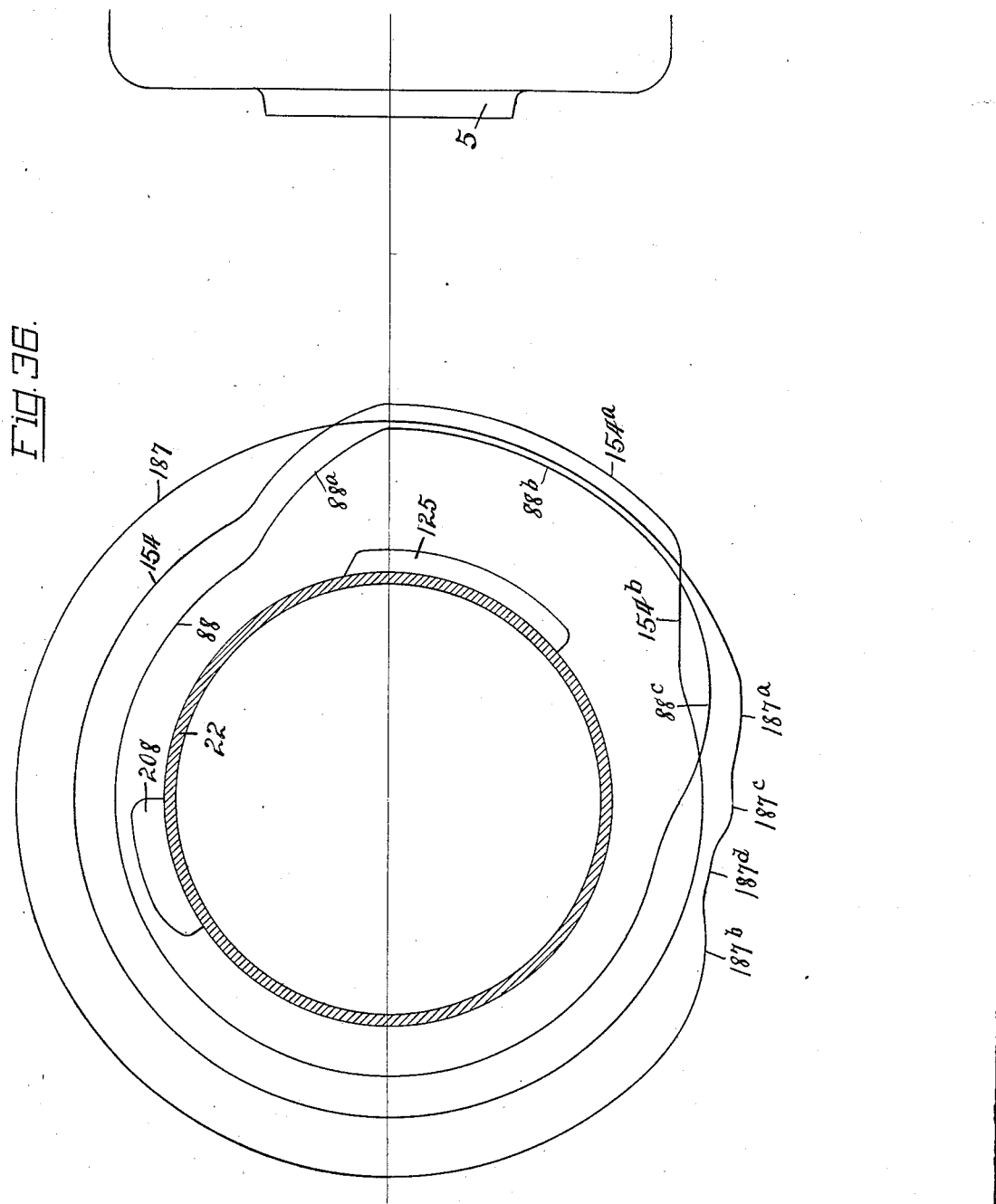

UNITED STATES PATENT OFFICE.

JOSEPH W. ROBINSON, OF TOLEDO, OHIO, ASSIGNOR TO THE LIBBEY GLASS COMPANY, OF TOLEDO, OHIO, A CORPORATION OF OHIO.

GLASS-WORKING MACHINE.

1,147,892.  Specification of Letters Patent.  Patented July 27, 1915.

Application filed April 17, 1914. Serial No. 832,487.

*To all whom it may concern:*

Be it known that I, JOSEPH W. ROBINSON, a citizen of the United States, and a resident of Toledo, in the county of Lucas and State of Ohio, have invented a certain new and useful Glass-Working Machine; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to machines for use in connection with the working of molten matter, such for instance as glass, and relates particularly to that type of machine which operates continuously and automatically to gather the metal from a furnace or pot and then to shape it in molds of desired form.

The invention is particularly useful in that type of machine which rotates continuously on a vertical axis and carries one or more units which successively act to gather metal from a vessel and deliver it to means which operates automatically to shape the gathered portion into predetermined form by mechanical action as distinguished from pneumatic action.

While the invention is particularly valuable along the lines above indicated, it is to be understood that neither it nor any of the features thereof is by any means limited either to the type of machine which rotates, continuously rotates, or rotates on a vertical axis, or which gathers its glass or other metal from a pot, vessel or furnace of any particular type, or to the type of machine in which the metal is pressed into a predetermined shape, for the invention and the different features thereof are capable of use in numerous other connections, and are intended for use in any connection for which it or they may be adapted or appropriate.

The primary object of my invention is to provide a machine of this character, which is positive, accurate, and reliable in its operation, and capable of producing a wide range of glassware of the pressed type, and particularly tumblers, bowls and similar articles having open portions from which male dies or forming members can be withdrawn.

A further object of my invention is the provision of a mechanical article shaping mechanism having a matrix mold adapted to be swung from shaping to receiving position, and vice versa, the control means for which may be periodically operated during a movement of the support carrying the mold.

A further object of the invention is the provision in a machine of the character described of simple improved and efficient means for actuating and controlling the movements of the respective article shaping parts, whereby such movements are properly timed with the movements of other parts of the machine.

A further object of the invention is the provision of means, in conjunction with the matrix mold swinging means, for maintaining the mold upright during its swinging movements.

A further object of the invention is the provision, in combination with the molding parts, of a mechanism which is periodically operable, during an operation of the machine, to eject a shaped work piece from a mold.

Further objects and advantages of the invention will be apparent to those skilled in the art from the following detailed description thereof.

The invention is fully described in the following specification, and while, in its broader aspect, it is capable of embodiment in numerous forms or of having the different elements thereof changed, a preferred embodiment for use in the manufacture of tumblers or other similar glassware is illustrated in the accompanying drawings, in which,—

Figure 2:
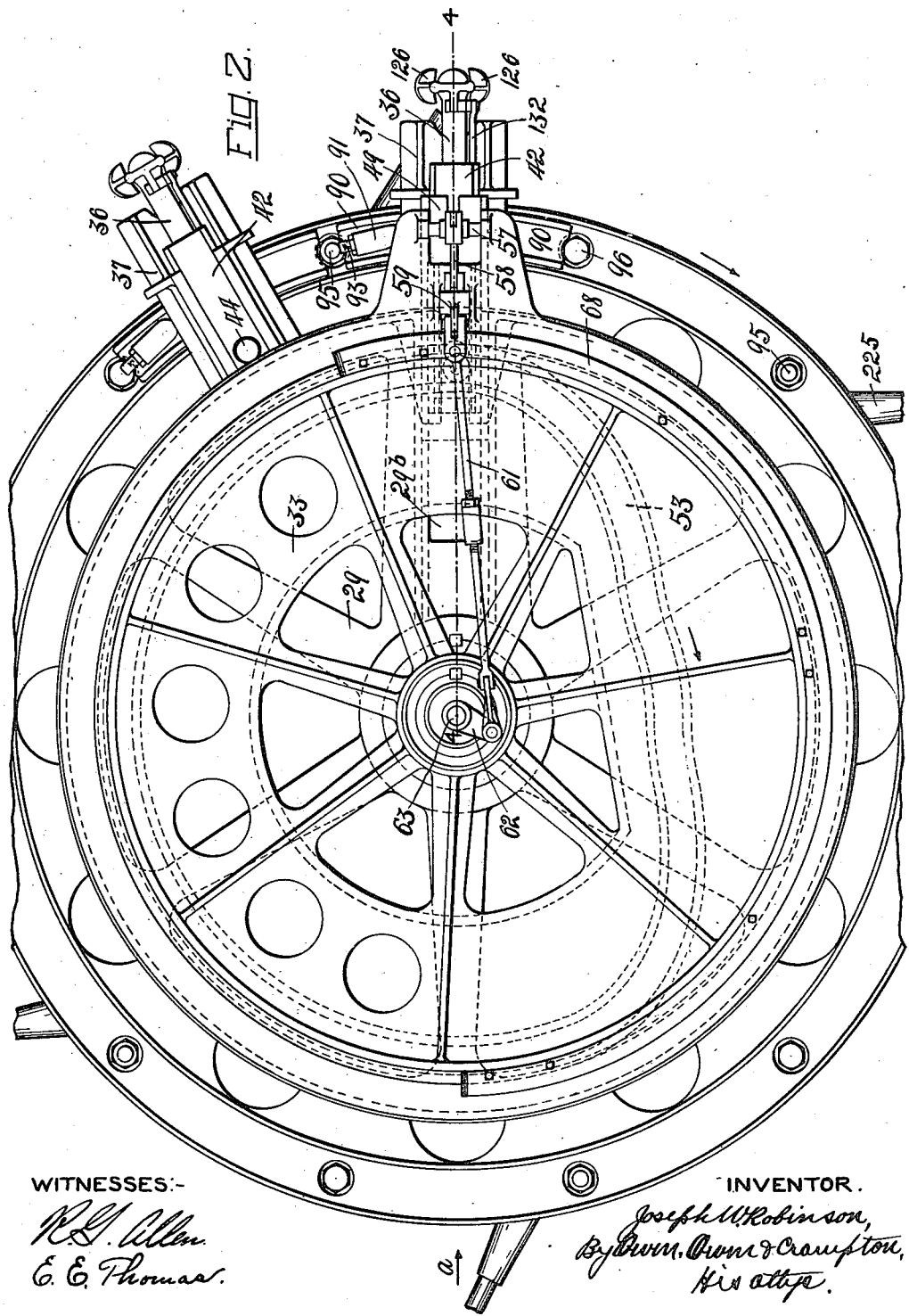
Figure 3:
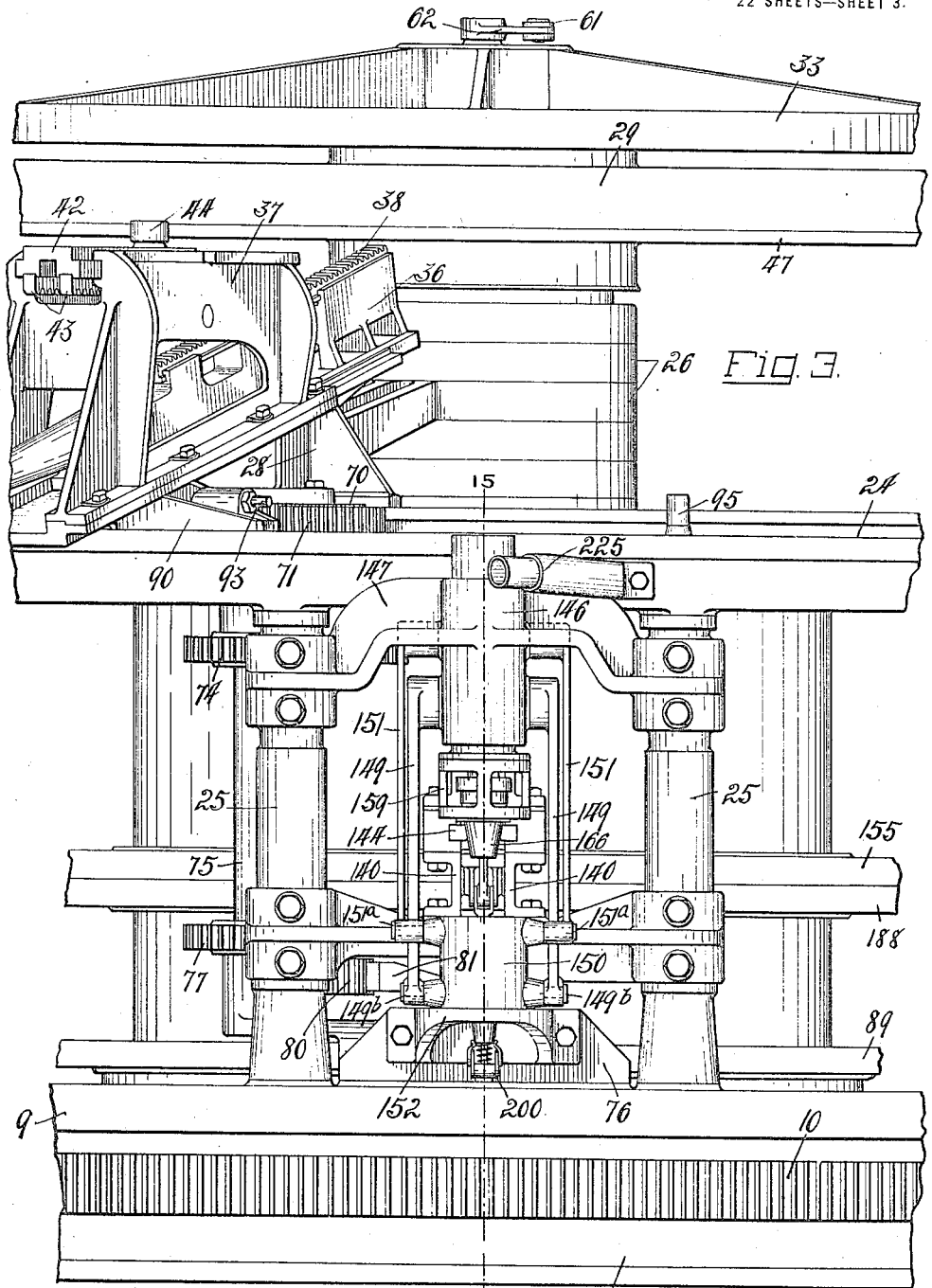

Figure 1 is an elevation of a machine embodying the invention and equipped with six gathering and shaping units, with the matrix mold of the unit directly in front raised to receiving position with respect to the gathering mechanism. Fig. 2 is an enlarged top plan view thereof with portions broken away and with the gathering mechanism of two units shown, one gathering ram having just returned from its gathering stroke. Fig. 3 is an enlarged elevation of a side portion of the machine looking in the direction of the arrow in Fig. 2, with the gathering mechanism of a unit in normal position relative to the shaping mechanism thereof, and with parts removed. Fig. 4 is an enlarged section on the line 4—4 in Fig. 2 with the ram carrying spider in section on the line 4—4 in Fig. 14, parts being in full. Fig. 5 is an enlarged section on the line 5—5 in Fig. 4, with parts broken away. Fig. 6 is an enlarged side elevation of a portion of the machine embodying the shaping mechanism of one unit, with parts broken away and removed. Fig. 7 is a plan view of one gathering mechanism and parts supporting the same, with the mechanism at the limit of its arresting movement relative to the support. Fig. 8 is an enlarged broken detail of portions of the ram-carriage moving gears of adjacent units. Fig. 9 is a sectional detail of the cushioning means employed for limiting the movement in one direction of a ram-carriage relative to its supporting spider. Fig. 10 is a sectional detail of a ram and its carrying parts on the line 10—10 in Fig. 7. Figs. 11, 12 and 13 are different enlarged sectional views of the gathering end portion of a ram. Fig. 14 is a top plan view of the upper spider, with parts broken away. Fig. 15 is a section on the line 15—15 in Fig. 3, with parts in full and parts removed. Fig. 16 is a detail in elevation of the shaping mechanism and a portion of the control gearing for the ram-carriage, with parts broken away. Fig. 17 is a sectional detail of the article-shaping mechanism with the plunger raised, and with parts broken away. Fig. 18 is a similar detail with the plunger lowered. Fig. 19 is a sectional detail of a portion of the article-shaping mechanism, illustrating the article ejecting means. Figs. 20, 21 and 22 are different sectional details of the plunger portion of the shaping mechanism. Fig. 23 is a cross-section of the machine taken immediately below the upper spider, with a portion of the units removed. Fig. 24 is a similar cross-section cutting the units substantially on the line 24—24 in Fig. 15. Fig. 25 is a cross-section on the line 25—25 in Fig. 15. Fig. 26 is a section taken substantially on the line 26—26 in Fig. 16. Fig. 27 is a vertical sectional detail on the line 27—27 in Fig. 28. Fig. 28 is a cross-section of the truck or base portion of the machine taken on the line 28—28 in Fig. 27. Figs. 29, 30, 31 and 32 are enlarged sections of the upper spider on the lines 29—29, 30—30, 31—31 and 32—32, respectively, in Fig. 14. Fig. 33 is a perspective view of the ram-dog. Fig. 34 is a perspective view of the ram-dog slide. Fig. 35 is a view from below of the ram actuating slide. Fig. 36 is a diagram illustrating the relative positions of the cam-ways controlling the movements of the ram-carriage, the plunger and the mold, and of the vacuum-valve and article-ejecting means.

*General description.*—In order that the detailed description of the mechanism embodying my invention may be more readily understood, a general description of the same, in which the parts are not referred to by reference characters, will first be given, and particular attention in this connection is directed to Figs. 1, 4, 15, 27 and 28.

The entire machine rests on a wheeled truck which travels on tracks extending away from the furnace so that the machine may be readily moved to and from the furnace as desired. Rising from this truck and extending to the top of the machine is a hollow central column of stepped formation which supports the stationary cams and the major operating parts of the machine.

The central column is surrounded by two spiders one arranged near the base of the column and the other arranged above the lower spider in spaced relation thereto. The two spiders are rigidly connected by a series of posts or standards and combine with such posts to form a framework which is supported by the column on suitable bearings provided on stepped portions thereof, and is adapted to continuously rotate around the column, being driven by a suitable motor and gearing. A hollow shaft extends up through the central column being journaled at its lower end in the truck and at its upper end in the upper end of the column, and carries at its upper end without the column a cam plate. This central shaft is driven in any suitable manner and is geared, in the particular machine illustrated, to rotate six times as rapidly as the rotating frame consisting of the upper and lower spiders and their connecting posts.

The posts connecting the upper and lower spiders are arranged in pairs, six pairs being used in the present machine, and each pair has associated therewith, and assists in supporting, one complete unit of the machine. These units are divided into an upper and a lower element, the upper element comprising the glass gathering mechanism and the lower element the article-shaping mechanism.

A "ram-slide" or means for controlling the projecting and retracting movements of the gathering ram is carried by the stationary cam plate and the gathering mechanism of each unit moves into connection therewith when such mechanism is adjacent to the working opening of the furnace or pot. The movements of the ram-slide are controlled by the cam plate, which is carried and driven by the hollow central shaft, and is operated by such cam plate six times during each complete rotation of the unit carrying frame-work, and its operating movements are so timed with relation to the movement of said frame-work as to operate the gathering mechanism of each unit to enter the furnace to gather a quantity of glass and then be retracted to discharging position as the unit moves into proper position with respect to the furnace for such purpose.

As the gathering device on the ram enters the furnace or pot and is dipped into the molten metal a cam mechanism opens a vacuum-valve which permits a suction action to take place through the gathering device to draw and hold a predetermined quantity of metal therein. As the ram retreats from the furnace a cut-off mechanism is automatically operated to cut the surplus metal from the gathering head, and preferably while the gathering head is still in the furnace or pot, so that the metal so cut off drops back into the pot or outside of the gathering ring customarily used in furnaces of this character. When the ram has retreated to its normal position the metal gathered thereby is deposited into a registering matrix or female mold which at this period in the operation is held in position to receive the metal from the gathering device, such metal being released from the gathering head by the absence of suction within the gathering head at this stage. The matrix, which receives the metal from the gathering head, normally stands in lowered position, out of register with the gathering head, and in position for the plunger or male die to enter the same when lowered for such purpose. Shortly prior to the dumping period of the gathering head the associated matrix is automatically raised in position to receive the metal from the gathering head and is subsequently lowered to normal position after which the plunger is automatically operated to enter the matrix and press the metal therein into desired form. When the article has been formed and the unit has reached a predetermined point in its revolution, an article-ejecting mechanism is operated to raise the article from the matrix to facilitate its removal therefrom.

While the ram has been traveling to and from the furnace or pot the gathering mechanism, including the ram, has ceased rotation about the central axis in the machine, although the spiders, the upper one of which carries the gathering mechanism, rotate continuously and, when the metal has been gathered and the ram returned to substantially its retracted position, the gathering mechanism then resumes its travel with the spiders around the axis of the machine. After a releasing or dropping of the gathered metal into the matrix, the gathering mechanism is swung forward on the upper spider until it is returned to its original position, whereupon it travels uniformly with the spiders until it again comes opposite the working opening.

A detailed description of the machine will now be given.

*Truck and frame work.*—The truck of the machine comprises a frame or body part 1 (Figs. 1, 27 and 28) which is supported by four wheels 2 mounted on the respective ends of front and rear axles 3. The wheels 2 rest upon a pair of rails 4 forming a track leading to and from the furnace or pot 5.

Rigidly mounted on the top of the body or frame part 1 of the truck is the bottom section 6 of the central stationary drum or column of the machine. This bottom section 6 has its outer edge portion stepped to form the circular track or bearing surface 7, preferably having an upstanding oil retaining flange 8 at its outer edge (Figs. 15 and 27). The lower spider 9 loosely surrounds the upper portion of the bottom section 6 and rests upon the bearing surface 7 for rotary movements relative thereto. The spider 9 is provided on its bottom portion without the part thereof having contact with the bearing surface 7, with an annular gear 10 with which a drive pinion 11 meshes. This drive pinion is carried at the upper end of a vertical shaft 12 which is journaled in one end portion of the truck frame 1 (Figs. 27 and 28) and carries a gear 13 at its lower end beneath the adjacent portion of the truck frame. A motor 14, which is carried by a bracket 15, projecting from one end portion of the truck frame 1, has its shaft connected by a set of gears 16 to a shaft 17 journaled in a bracket 18 of the truck frame, longitudinally thereof and having one end in bevel-gear connection, as at 19, with an upright shaft 20 carrying a gear 21 in mesh with the gear 13 (Figs. 27 and 28). It will be understood that while I have shown one form of driving means for the lower spider 9, the specific construction of such means forms no part of the present invention and may be changed as desired.

Rigidly mounted in concentric relation on the top of the bottom section 6 of the central standard or column is the cam section 22 of the central column (Figs. 4, 15 and 27), which carries various cams, as will hereafter be more fully described. Rigidly rising from the top of the cam section 22 is the top section 23 of the column, which is centrally disposed relative to the section 22 and of smaller diameter than such section to form an annular bearing ledge or surface at the upper end of the section 22 without the section 23.

The top spider 24 of the machine (Figs. 4 and 15) rotatably surrounds the base portion of the top column section 23 and rests upon the upper outer edge portion or ledge of the cam section 22. 25 are posts or standards which rigidly connect the outer edge portions of the lower and upper spiders 9 and 24 so that said spiders and posts constitute a frame work which rotates around the central column and is driven by means of the annular gear 10.

Rotatably surrounding the top section 23 of the central column, in the present instance, are six rings 26 (Fig. 4) each having a bracket arm 27 projecting outwardly therefrom and rigidly attached to one of the ram-carriages 28 of the machine, said carriages being six in number when the machine illustrated is fitted with its full complement of units. The connecting of the ram-carriages 28 to different rings 26 enables each ram-carriage to be arrested with relation to the spider 24 during the gathering period of the associated ram, as hereinafter described.

Stationarily fixed to the top section 23 of the column above the rings 26 is a ram-slide support 29 (Figs. 1, 2, 3 and 4). A hollow shaft 30 extends upward through the truck frame and the center of the central column, being suitably journaled at its lower end in a bearing 31 in the truck frame (Fig. 27) and at its upper end in a bearing 32 in the upper end of the top column section 23 (Fig. 4). Fixed to the upper end of the shaft 30 without the standard 23 is a ram-slide cam-plate 33 (Figs. 1, 2 and 4), the shaft 30 being so geared in the machine illustrated as to cause the plate 27 to rotate six times as rapidly as the spider frame. For this purpose the shaft 30 carries at its lower end below the truck frame 1 a large gear 34, which is connected with the pinion 21 through a pinion 35, thus connecting the shaft 30 with the motor 4. It will, of course, be understood that the ratio of the gears which connect the pinion 21 to the spider-gear 10 and to the shaft 30 are such as to cause the shaft 30 to rotate six times as rapidly as the spiders.

*Gathering mechanism.*—The gathering mechanism consists broadly in a device which may be called the ram, which, at required intervals, is projected or dipped into the metal in the furnace or pot, sucks up the required quantity of metal, cuts off the surplus metal, drops it where it will not cool or interfere with the fluid metal at the gathering point in the pot, and delivers it to the matrix mold, which thereafter retains the metal until it is shaped into the desired form.

In the accompanying drawings, the glass pot or furnace, which may be of any desired type, is conveniently shown at 5, and provided with a working opening 5ª. In order to prevent the surplus metal, when cut off from the gathering mechanism, from dropping into the portion of the pot from which the metal is gathered, it is preferable to provide the furnace with a working ring (not shown), as is common in furnaces of this type. With such ring the surplus metal, when cut off from the gathering mechanism, drops outside of the ring and does not chill the metal within the ring. The furnace is, of course, no part of the present invention and is merely shown conventionally in the drawings, for, in order to operate my machine continuously and most conveniently I use with it a continuously melting furnace either of the tank type or pot type, whereby the body of metal suitable for working is constantly maintained at the desired level just inside the working opening of the furnace.

The ram 36 of each unit carries a gathering device at its outer end and is supported upon the ram-carriage 28, which slidably rests upon the top spider 24 for arcuate movements thereon, with the top column section 23 as its axis. The ram-carriage, ram, and the parts carried thereby may be collectively termed the "gathering mechanism". The ram 36 (Figs. 4, 7 and 10) slides back and forth upon the ram carriage 28 diagonally to the vertical and radially to the machine within a housing 37 which is rigidly mounted on the carriage. A rack-bar 38 is fixed to the upper side of the rear portion of the ram 36 and meshes with a gear wheel 39, which is loosely mounted on a stationary shaft 40 secured in the side walls of the housing 37, said gear wheel having a pinion 41 at each side thereof in fixed relation thereto, said pinions having fewer teeth than the gear wheel 39 (Figs. 5 and 10).

Slidingly mounted on the top of the ram-housing 37, in a longitudinally extending slide-way 37ª provided therein, is a slide 42, which carries two rack-bars 43 in mesh at the respective sides of the gear wheel 39 with the pinions 41. The slide 42 is mounted to move horizontally and radially backward and forward relative to the machine (Figs. 2, 5, 7 and 10), and as it moves backward it rotates the pinions 41, through their engagement with the rack-bars 43, and effects a consequent rotation of the gear-wheel 39 in a direction to cause the ram 36 to be projected forward and downward. Owing, however, to the differential between the pinions 41 and the gear-wheel 39, the ram travels farther and more rapidly than the slide 42 which actuates it. The slide 42 connects, by means of a roller 44 thereon, with the ram-dog slide 45 (Figs. 4 and 5), the roller engaging in a groove 46 on the under side of the slide 45. The inner wall of the groove 46, in what may be termed the position of rest of said ram-dog slide, registers with and provides a continuation of an annular flange 47 (Fig. 5) extending around the edge of the ram-slide support 29, which flange, engages the roller 44 and thereby limits the inward radial movement of the slide 42, and retains the ram 36 in its retracted or normal position.

The ram-dog slide 45 runs on slide-ways 48 provided on the under side of the ram cam-slide 49 and is detachably connected with the slide 49 by means of a dog 50 (Figs. 4 and 5). The ram-dog 50 is mounted on a horizontal pivot at the forward end of the ram-dog slide 45 and is provided with a lip 50$^a$, a lug 50$^b$, and a pocket 50$^c$ (Fig. 33). A spring 51 normally holds the ram-dog in the position shown in Fig. 4, in which position the forward end of the dog, which is preferably beveled as shown, engages a notch 49$^a$ on the under side of the ram-cam slide 49 (Fig. 35), the forward end of the slide 49 being slotted to permit the lengthwise travel of lug 50$^b$ of the ram-dog. The engaging of the forward end of the dog 50 within the notch 49$^a$ prevents the slide 45 from having movements relative to the slide 49, while a boss or flange 49$^b$ at the inner end of the slide 49 coacts with the rear end of the slide 45 to prevent the slide 45 from moving rearwardly relative to the slide 49. It is thus evident that when the dog 50 is in engagement with the notch 49$^a$ the slides 45 and 49 are locked together and caused to have movements as a single unit.

The ram-cam slide 49 is supported on suitable slide-ways 29$^a$ formed on the under side of the ram-slide support 29. The ram cam-slide 49 is provided on its top with a roller 52, which extends upwardly through a slot 29$^b$ in the ram-slide support and travels in a cam-groove 53 on the under side of the ram-slide cam-plate 33. The cam-groove 53 is so arranged that once in each revolution of the ram-slide cam-plate 33 the roller 53 will be carried thereby to the rear of the slot 29$^b$, thereby correspondingly carrying back the ram-slide 49, the ram-dog slide 45, the slide 42 and attached rack-bars 43, rotating the pinions 41 and the gear wheel 39, whereby the ram 36 is projected forwardly and downwardly and dipped into the working chamber of the furnace. A further rotation of the ram-slide cam-plate 33 returns the roller 52 to the forward end of the slot 29$^b$ and reverses the movement of the ram to return it to retracted or normal position.

When it is desired to lock the ram against radial movements when the machine is being rotated, the ram-dog 50 is thrown downward out of engagement with the notch 49$^a$ in the ram cam-slide 49 and into position to place its lip 50$^a$ into a hole 54 in a bracket 55 carried by the extreme forward end portion of the ram-slide support 29 (Fig. 4). This is accomplished by means of a lever 56 pivoted at 57 to the ram-slide support 29, one arm of which lever is adapted to force the dog 50 out of engagement with the ram cam-slide 49 and into the hole 54 and to hold it in that position, while the other arm of the lever 56 is connected by means of a link 58 with one arm of a three-armed lever 59, which is pivoted to a bracket 60 upon the ram-slide support 29 (Figs. 4 and 5). Another arm of the lever 59 is connected by a link 61 with an arm 62 rigidly secured to the upper end of a rod 63 arranged at the axis of the machine and projecting entirely through the hollow shaft 30 with its upper and lower ends journaled in the upper and lower portions of such shaft (Figs. 2, 4 and 27). The lower end of the rod 63 is provided without the lower end of the shaft 30 with an arm 64, which is connected by a link 65 (Figs. 27 and 28) to one end of a control lever 66, which, in the present instance, is fulcrumed to the bracket 15, a movement of the lever 66, in the direction of the arrow, causing a movement of the lever 56 (Fig. 4) to release the lug 50$^b$ of the dog 50 and to force such dog downward into engagement with the bracket 55, whereby to lock the ram against outward movement. The lever 66 may be held at each extreme position of its adjustment by means of a quadrant and engaging dog, as shown at 67 (Fig. 28), or in any other suitable manner. When the control parts for the dog 50 are in the position shown in the drawings the ram-dog slide 45 and the ram cam-slide 49 will constitute in effect a single slide.

To prevent any operation of the dog shifting mechanism at a time when any of the automatic mechanism would tend to operate the ram or ram-carriage, a segmental plate or flange 68 (Figs. 1, 2, 4 and 5) is provided on a part of the periphery of the ram-slide cam-plate 33. This plate or flange projects in the path of a roller 69 on the arm 59$^a$ of lever 59, so that such lever is positively retained in one or the other of its limits of shifting movements when a unit is in the part of its cycle where the plate 68 projects either above or below the path of the roller 69. It is thus evident that the coöperation of the plate 68 and lever-arm 59$^a$ provide a safety device which prevents an operation of the dog 50 to either lock or release the ram-dog slide 45 relative to the ram cam-slide 49 when any of the gathering mechanism is in operative position. It will be understood that the spring 51 (Fig. 4) will assist the dog controlling mechanism to move the dog 50 from engagement with the bracket 55 and will tend to retain the dog in engagement with the notch 49$^a$ in the ram cam-slide 49.

*The ram-carriage swinging device.*—We will now take up the mechanism which controls the swinging movements of the ram and its carriage relative to the upper spider 24, whereby the movement of the gathering mechanism with such spider in its rotation about the axis of the machine automatically ceases during a predetermined period, or while the ram is moved radially forward into the furnace and back, the gathering mechanism then resuming its travel with the spiders around the axis of the machine and swinging ahead more rapidly than the movement of the spiders until it regains its original position. In considering this feature of my machine, it should be borne in mind that the ram-slide support 29 is non-rotatably secured to the top column section 23, so that the ram cam-slide 49 and the ram-dog slide 45 do not rotate about the axis of the machine, but merely have a backward and forward radial movement produced by the action of the cam on the ram-slide cam-plate 33 against the roller 52. Consequently when the roller 44 comes into position in the groove on the under side of the ram-dog slide 45, then, if the ram-dog 50 is in operative engagement with the ram cam-slide 49, the ram and its carriage must automatically stop in its rotation about the axis of the machine. The connecting of the ram-carriages to the respective rings 26, which loosely encircles the top column section 23, permits a rotation of each ram-carriage relative to the spiders and to the other ram-carriages of the machine.

Each ram-carriage 28 is provided on its bottom with a toothed segment 70 (Figs. 3, 4, 7 and 16) meshing with a gear 71 on a vertical shaft 72, carried by the spider 24. This shaft also carries a pinion 73, at the under side of the spider 24, which meshes with a pinion 74 on a vertical shaft 75. This shaft is suitably journaled at its upper end in the spider 24 and at its lower end in a bearing bracket or frame-part 76, which is fixedly carried by the lower spider (Figs. 16 and 24). A gear 77 is carried by the lower portion of the shaft 75 and meshes with a pinion 78, the shaft 79 of which is suitably journaled in the frame part 76 and carries a pinion 80 in mesh with a rack-bar 81 (Figs. 16, 24, 25 and 26). The rack-bar 81 is provided at one side edge of a plate 82, which is adjustably bolted to the top of a slide 83 (Figs. 24, 25 and 26), which is mounted for radial movements relative to the axis of the machine in a slide-way 84 in the frame part 76.

The plate 82 is secured to the slide 83 by bolts 85 projecting through slots in the plate, which permit the plate and slide to have relative longitudinal adjustment, and set-screws 86 are threaded through portions of the slide at opposite ends of the plate 82 and coact with the plate to rigidly hold the same in adjusted position relative to the slide (Figs. 15, 25 and 26). On the bottom of the slide 83 is a roller 87, which projects below the slide-way 84 through a registering slot in its bottom and engages in a cam-way or groove 88 upon the ram-carriage swinging-cam 89, which cam is attached in any suitable manner to the cam section 22 of the central column (Figs. 15, 16, 24, 25 and 26).

The result of this arrangement is that as the spider frame rotates around the stationary central column the cam-way 88, engaging the roller 87 on the slide 83, moves said slide radially away from the center of the machine from the position shown in Figs. 15, 16, 25 and 26 and at the left of Fig. 24 to the position of the slide shown at the right of Fig. 24, thereby rotating the gear which connects the rack-bar 81 with the segmental-rack 70 on the associated ram-carriage 28. The portion 88$^a$ of the cam-way 88 and the gear connecting the rack-bars 81 and 70 are so proportioned that during a movement of a point on the spider-frame between the dotted lines $a$, $b$ (Fig. 24), or in other words, during the outward movement of the slide 83 by the cam portion 88$^a$, the movement of the connected ram-carriage 28 will be arrested, due to said gearing swinging the ram-carriage rearwardly relative to the spider-frame at the same rate of speed as the speed of forward rotation of said frame. It is during this period of resting movement of the ram-carriage that the ram is moved forward into the furnace to gather its metal and then returned to normal position. When the slide 83 is at the limit of its outward movement, the ram 36 is at the limit of its inward movement, and the ram-carriage 28 is at the limit of its rearward swinging movements relative to the spider-frame, the roller 87 arrives at and travels in a neutral portion 88$^b$ of the cam-way 88 (Fig. 24), thus causing the gathering-mechanism to resume travel with the spiders. After the spider-frame and gathering-mechanism have traveled together a predetermined distance with the gathering-mechanism in its rearwardly swung position the roller 87 enters the cam portion 88$^c$ of the cam-way 88 and returns therethrough to the inner neutral portion 88$^d$ of the cam-way and effects a retraction of the slide 83 to its rearward position and a consequent forward swinging movement of the gathering mechanism at a more rapid speed than the rotation of the spider frame to swing the gathering mechanism to its normal position relative to the spider frame. The gathering-mechanism and parts controlling the swinging movements thereof are then held in this normal position until the ram again arrives in front of the working opening of the furnace.

It will be understood that the interior portion 88$^b$ of the cam-way 88 is so proportioned that the ram-carriage is not swung forward relative to the spider-frame until the gathering-mechanism has completed its operation and delivered the gathered metal to the matrix mold, as hereinafter described.

The ram-carriage when in its normal position relative to the spider frame stands between one pair of posts 25 connecting the upper and lower spiders, and, when swung rearwardly relative to the spider frame, moves over one post of the pair and adjacent to the forward post of the succeeding pair. The ram-carriage is provided with laterally extending bearing flanges 90, which bear upon an annular bearing surface of the spider 24. To compensate for lost motion and to insure bringing the ram-carriage to an exact position on the top spider when carried backwardly with relation to the spider, i. e., when it is stationary with relation to the furnace, the carriage is provided with a stop device, as shown in Figs. 7 and 9. This device consists in providing a housing 91 on the rear bearing flange 90, which housing contains a spring 92, a headed pin 93 seated against the spring and projecting from the housing, and an adjustable nipple 94. The spring 92 forces the pin outwardly with the shoulder of its head seated against the nipple 94. Upon a backward swinging of the ram carriage on the top spider the pin 93 will be brought against the upwardly projecting end of one of the bolts or screws 96, by which alternate upright posts 25 are secured to the top spider. This relative position of the ram-carriage and top spider corresponds to the position in which the gathering device of the ram is in axial alinement with the associated matrix mold of the machine when such mold has been raised to receiving position (see central unit Fig. 1). The threaded nipple 94 enables an adjustment of this stop device to accurately bring the ram-carriage 28 to this point. In the machine illustrated the number of ram-carriages and the lengths of the segmental racks 70 thereof are such that when a carriage is swung rearward relative to the spider frame the rear end of one rack will extend rearwardly beyond the forward end of the rack of the succeeding ram carriage. To allow for this the adjacent ends of succeeding racks are reduced in width, one at the top portion thereof and the other at the lower portion thereof to permit such ends to lap one another, as shown in Fig. 8.

*The gathering device.*—The mechanism carried at the end of the ram whereby the metal is gathered from the furnace, will now be described.

Upon the furnace end of the ram is mounted a gathering-cup 97, which is fitted snugly into a port 98 at the outer end of the passage-way 99 in the ram and secured in position by set-screws 100 (Figs. 10, 11, 12 and 13). This cup is provided at its lower or exposed end with a gathering cavity 101 of suitable size to gather the desired quantity of metal, and has a port 102, which, in the present instance, is in the form of slot, opening communication between the cup cavity and the ram passage 98—99. The slot or port 102 extends from adjacent to one edge to adjacent to the opposite edge of the cup vertically around the cavity or lengthwise thereof and opens throughout its length into a passage 103 in the wall of the cup, which passage leads to the port 98 in the ram. The cup 97 is preferably made in two separable sections, the point of separation being through the slot 102 and passage 103 lengthwise thereof so that one wall of the slot 102 and one side portion of the passage 103 are formed in each half or section of the cup, as shown. The slot 102 is exaggerated in the drawing for the purpose of illustration. A ring 104 is fitted around the cup 97 and serves to hold the cup sections closely together. The passage 99 in the ram extends substantially throughout the length thereof and has a valved opening 105 in position to register with a port 106 in a vacuum-chamber or passage 107 provided in the carriage 28 when the ram is in its retracted position (Fig. 10). The ram 36 is also provided with a port 108 near the rear end of the passage 99, which port is adapted to register with the port 106 in the carriage when the ram is at or substantially at the limit of its forward movement.

The carriage 28 is provided adjacent to the rear end thereof with a segmental bearing part 28ª (Figs. 4 and 7), which is greater in length than the swinging movement of the carriage and is provided in the under side thereof with a longitudinally extending recess 109, which communicates intermediate its ends with the interior of the vacuum chamber 107 in the carriage, as shown in Fig. 10. The recess 109 is permanently in register at some point thereof with a port 110 leading into an auxiliary vacuum chamber 111 in the upper spider 24 (Figs. 4 and 32), one of such chambers being provided for each ram carriage of the machine. The chamber 111 has communication through a port 112 with a rearwardly extending passage 113 in the upper spider, and such passage in turn has communication at its inner end through a port 114 with an annular passage 115, which is provided in the spider around the central column of the machine. One or more ports 116 are provided in the bottom portion of the spider and open communication between the annular passage 115 and the annular vacuum chamber 117, which is provided in the upper end portion of the cam section 22 of the central column, and has the portion with which the ports 116 register restricted, as shown at 117ª (Fig. 4). The column section 22 being stationary, a pipe 118 opens communication between the vacuum chamber 117 and any suitable air exhausting means. A vacuum-valve 119 seats in the port 112 and has a stem 120 extending downwardly therefrom through said port and the registering portion of the spider 24, and is provided below the spider with a spring 121 adapted to normally urge the valve to its seat to close said port. Pivotally mounted on a bracket 122 on the under side of the upper spider 23 is a lever 123, having a shoulder 123ª in position to have upward thrust contact with the lower end of the valve stem 120 and carrying a roller 124 at its free end in position to have contact with a cam-flange 125 on the column section 22. The period of coaction of the lever roll 124 with the cam 125 during a cycle of operations of a machine unit is such that the vacuum-valve 119 is opened at the time of dipping of the gathering head or cup 97 into the metal within the furnace, and is closed at approximately the point in the movement of the spider frame where it is desired to release the gathered metal to permit it to drop into a subjacent mold.

*The cutting-off device.*—The mechanism for cutting-off or removing from the gathering cup the surplus metal gathered in the furnace will now be considered. This mechanism (see Figs. 1, 4 and 8) comprises opposed cutting knives 126, which have a shearing lapping action immediately under the gathering end of the gathering cup 97 and are carried by respective lever-arms 127, which are pivoted to a common pivot 128 on the top of the gathering end of the ram 36 above the gathering cup. A bell-crank lever 129 is fulcrumed to a bracket 130 on the top of the ram 36 (Fig. 10) and has one arm extended forward and connected by links 131 to the levers 127. The links 131 have ball-and-socket connection at the respective ends with a cross-arm of the lever 129 and with the knife carrying levers 127, whereby the movements of the levers 127 in both directions are controlled by movements of the lever 129. The other arm of the lever 129 is connected by a link 132 to one arm of a bell-crank lever 133, which is fulcrumed to one side of the rear end portion of the ram 36, the other arm of such lever carrying a roller 134, which travels on a cam runway 135 of the housing 37. The run-way 135 is provided with connecting reverse inclines, which are so positioned relative to the movement of the ram as to coact with the roller 134 and cause the cutters 126 to operate to cut off the surplus metal preferably before the gathering end of the ram has been withdrawn from the furnace, and in position for the cut-off metal to fall into the space without the working ring, which is customarily used in glass furnaces. By dropping the surplus metal without the working ring the working metal within the pot is not chilled thereby.

*The article molding mechanism.*—The mechanism which receives and shapes the gathered glass or other metal after it is dropped from the gathering mechanism at the end of the ram will now be described. This mechanism is illustrated in Figs. 3, 4, 6, 15, 16, 17, 18, 19, 20, 21, 22, 23, 24, 25 and 26.

Fixedly mounted on the frame part 76 of each machine unit is a frame 140, which, in the present instance, is built up in sections and provided with race-ways 141 and 142, which extend radially of the machine and in which operate slides 143 and 144, respectively, the purpose of which and the manner of operating thereof being hereinafter described. The frame part 140 forms two opposing walls in the inner sides of which the race-ways 141 and 142 are provided, and fixed to and extending upwardly and forwardly from the upper forward portions of such walls are a pair of bracket arms or frame parts 145, which terminate at their forward ends in a bearing-head 146 and are laterally braced by arms 147 extending from the outer sides thereof, respectively, and being fixed at their outer ends to the adjacent posts 25 connecting the upper and lower spiders of the machine (Figs. 3, 4, 6, 15, 17, 18 and 23). The lower front portions of the frame parts 140 are connected to adjacent posts 25 by arms 140ª (Fig. 25). A rock-shaft 148 is journaled in the bracket arms 45 and fixedly carries an arm 149 without each bracket arm and a segmental gear 149ª between the bracket-arms, said gear meshing with a rack-bar 144ª on the top of the mold moving slide 144. The arms 149 pivotally connect at their free or forward ends to the lower portion of a matrix mold 150 at opposite sides thereof, as at 149ᵇ (Figs. 3 and 15). A similar pair of arms 151 is pivotally attached to the upper portion of the matrix mold 150, one at each side thereof, as at 151ª (Figs. 3 and 15) and have their opposite ends disposed at the outer sides of the respective bracket members 145 and pivoted thereto above the shaft 148, as at 151ᵇ. When the shaft 148 is rocked the arms 149, which serve as the power arms for the matrix mold 150, cause a raising or lowering of such mold as the arms may be raised or lowered, and the arms 151 have a parallel movement with the arms 149 and serve to maintain the mold in upright position during a raising or lowering thereof. When the matrix mold 150 is in its lowered or article forming position it rests upon a bracket or table 152, which is fixed to and projects forward from the forward end of the frame part 76 below the bearing head 146 and the horizontal plane of the shaft 148, thus causing the arms 149 and 151 to assume an inclined position, as shown in Figs. 3, 15, 17 and 18. An upward swinging of the power arms 149 causes the matrix mold 150 to swing outward and upward into position for its cavity 150ª to axially register with the gathering cup 97 of the gathering mechanism when the ram is in retracted position and its carriage is at the limit of its rearwardly swinging movement relative to the spider frame, as shown by the central unit of Fig. 1 and by Fig. 4. After the matrix mold has received a deposit of metal from the gathering cup it is returned to its normal at-rest position on the bracket 152 preparatory to receiving the article forming plunger, as hereinafter described.

The mold-slide 144 carries on its underside a roller 153, which engages in a camway or groove 154 in a cam 155, which is fixed to and encircles the cam section 22 of the central column (Figs. 4, 15, 16, 17, 18 and 23). The cam 155 projects at its edge into an opening 156, which is provided in the rear portions of the frame parts 140 between the race-ways 141 and 142 therein. The cam-way 154 is fashioned to effect an outward movement of the slide 144 and a consequent raising of the matrix-mold 150 to metal receiving position at approximately the period of arresting of the associated ram carriage by its cam-way 88 (Figs. 23 and 33), so that the matrix mold is in elevated receiving position when the ram is retracted from gathering position. The roller 153 now travels in an outwardly disposed neutral portion 154ª of the cam-way 154 so that the mold is held elevated until after the roller 124 of the lever 123, which controls the opening movement of the vacuum-valve 119, has passed from engagement with the valve opening cam 125, after which the slide 144 is retracted to its normal position and the mold 150 lowered by reason of the roller 153 returning to the neutral retracted portion of the cam-way 154, as is illustrated by the cam diagram in Fig. 23. The bracket 152, on which the matrix mold 150 normally rests, is provided at the rear of the mold with adjustable gage stops 157, which serve to stop the movement of the mold in proper position on the bracket.

The bearing head 146 is provided with a vertical opening therethrough in which the hollow pressure-head carrying plunger 158 has vertical reciprocatory movements. A mold pressure head 159 of skeleton form, in the present instance, is fixedly carried by the plunger 158 at the lower end thereof, and such head carries at its lower end a pressure plate or gasket member 160, which, when the plunger is lowered, is intended to seat down closely on the top of the matrix mold 150 in marginal relation to the cavity 150ª therein. The member 160 is provided in its center with an opening 161, which is substantially the size of and registers with the upper end of the matrix cavity. A downwardly projecting flange 162 is provided around the opening 161 for seating into a registering complemental recess 150ᵇ at the upper marginal edge of the matrix cavity 150ª. The flange 162 is intended to slightly overhang the edge of the matrix cavity, being of a width equal to the combined widths of the recess 150ᵇ and the thickness of the upper edge of the molded article 163, as best shown in Fig. 18. The plate 160 is removably secured to the carrying head 159 by screws 164 (Figs. 20, 21 and 22).

Mounted for vertical reciprocatory movements within the hollow of the plunger 158 is a plunger 165, which carries a male mold 166 at its lower end. This mold, in the present instance, is provided at its upper or inner end with a stem 167, which threads into the outer end of a plug 168 that is in turn threaded into the lower end of the plunger 165, such plunger being hollow throughout its length. A nut 169 is mounted on the plug 168 in position to have its inner end thrust against the adjacent end of the plunger 165, whereby to serve as a lock nut for preventing relative turning of the plunger 165 and plug 168. The mold 166 is partially disposed within the pressure plate carrying head 159 and has its outer end portion projected through the opening 161 in the pressure plate 160 and of a shape complemental to the matrix cavity 150ª, said mold and cavity, in the present instance, being of shapes adapting them to coöperate in the forming of tumblers. The inner end portion of the mold is provided with a cylindrical portion 166ª, which, when the article shaping portion of the mold is at the limit of its movement in the matrix cavity, projects into and closely fills the opening 161 of the pressure plate 160, as shown in Fig. 18.

For the purpose of enabling the die 166 to have a continued yielding downward movement relative to the pressure-plate 160 when such plate has moved into contact with and has seated on the adjacent end of the matrix mold 150, I provide a coiled compression-spring 170 within the hollow of the die-carrying plunger 165, the upper end thrust of such spring being against a plug or stop shoulder 171, which is adjustably threaded into the upper end of the plunger 165, the lower end of such thrust being against a member 172, which is mounted for axial movements in the hollow of the plunger 165 adjacent to the lower end thereof. The thrust member 172 is fixedly attached to the outer or pressure-head carrying plunger 158 by screw-studs 173, which are shown as being two in number (Figs. 17, 18 and 20), and as radially projecting from the member 173 through registering longitudinally extending slots 174 in the plunger 165, and have their outer ends projecting into registering openings 175 in the plunger 158. It is evident that the action of the spring 170 against the member 171, which is fixed to the inner plunger 165, and against the member 172, which is fixed to the outer plunger 158, causes the die-carrying plunger 165 to normally stand in raised or retracted position relative to the pressure-head carrying plunger 158.

The means employed for controlling the reciprocatory movements of the plungers 158 and 165 will now be described.

Mounted between the bracket-arms 148 on a shaft 176, which is carried at its ends by said arms, is a segmental gear 177, which has its toothed portion projecting through registering slots 178 and 179 provided respectively in the bearing-head 146 and in the plunger 165, longitudinally thereof (Figs. 17 and 18), and in mesh with a toothed rack 180 provided on the adjacent side of the die-carrying plunger 165. It is thus evident that rocking movements of the segmental gear 177 will impart reciprocatory movements to the plungers 158 and 165. A link 181 is pivotally attached at one end to the gear 177 and extends downward therefrom and has its lower end pivotally connected to a link 182, which in turn pivotally connects at its other end to the plunger operating slide 143. A swinging arm 183 projects forwardly from a fixed pivot or shaft 184 carried by the frame parts 140, and has its outer or forward end pivotally connected to the pivot 185, which connects the adjacent ends of the links 181 and 182, thus causing the link 181 to have longitudinal movements when the link 142 is longitudinally moved. Without the provision of the anchor arm 183, or some equivalent means, a reciprocatory movement of the link 182 would cause the link 181 to have swinging instead of reciprocatory gear actuating movements.

The plunger-controlling slide 143 carries on its upper side a roller 186, which engages in a cam-way or groove 187 in a cam 188 that is fixed to the cam section 22 of the central column of the machine. The cam 188 projects with the cam 155 into the recess 156 provided in the rear or inner end portions of the frame parts 140. The plungers 158 and 165 are intended to remain in the inoperative elevated position shown in Fig. 17 until after the matrix-mold 150 has received a deposit of metal from the gathering mechanism and then lowered to article forming position, with its cavity 150$^a$ in vertical register with the male-die 166. The plunger-moving slide 143 is now moved inward in a radial direction relative to the machine axis due to the coaction of the roller 186 and cam-way 187, and a downward movement is imparted in unison to the plungers 158 and 165 to bring the pressure-plate 160 to bear on the upper end of the matrix-mold 150 and to force the male-die 166 into the matrix cavity to effect a consequent shaping of the metal in desired form in the matrix. The male-die 166 continues its lowering movement into the matrix to finish its stroke after the pressure-plate 160 has been brought to bear on the upper end of the matrix-mold, due to the relative movement which the two plungers 158 and 165 are permitted to have by reason of the spring connection therebetween. In addition to permitting such relative movements of the plungers 158 and 165 the spring 170 causes the bearing pressure of the plate 160 upon the upper end of the matrix-mold 150 to be increased as the male-die 166 continues its shaping stroke, thereby preventing metal from being forced outwardly from the matrix around the pressure plate 160 by the pressing action of the die 166. The close fitting of the upper cylindrical portion 166$^a$ of the die 166 within the pressure plate opening 161 serves to prevent the metal from being forced outward between the die and pressure plate. In order to prevent a sudden outward forcing and splashing action of the metal within the matrix mold when the die 166 is lowered into pressing contact therewith, the die is caused to hesitate in its lowering movement when it has moved part way into the matrix, thereby permitting the metal to flow naturally around the die before the die continues its pressing stroke.

To accomplish the above described action of the plungers 158 and 165 the cam-way 187 is provided with a reëntrant portion 187$^a$ causing an inward movement of the slide 143 and a consequent down stroke of the plungers 158 and 165, the plungers being then quickly returned to their normal elevated position by the outwardly extending portion 187$^b$ of the cam-way 187, as shown in Figs. 23 and 33. The arresting or hesitating action of the die 166 after it has entered the matrix mold and before completing its stroke is occasioned by the travel of the roller 186 in a neutral portion 187$^c$ in the inwardly extending portion 187$^a$ of the cam-way 187. A neutral portion 187$^d$ at the inner end of the cam portion 187$^a$ of the cam-way 187 causes a slight arresting of the movement of the plunger within the matrix-mold when the plunger has completed its stroke so that the molded metal may become slightly set by the cooling action of the die 166 and the wall of the mold cavity 150$^a$ before the die is withdrawn therefrom.

*Article ejecting means.*—When a machine unit has reached a predetermined point in its cycle of movements the molded article, which is carried by the matrix mold 150 thereof, is raised or partially ejected from the mold to facilitate a gripping of the edge thereof and a removal of the article from the mold by an attendant. To accomplish this the matrix-mold 150 is provided in its bottom below the cavity 150ª with a socket 190 which has communication with the bottom of the cavity 150ª through an axially disposed opening 191, which is restricted relative to said cavity and socket. A stem 192 projects through the opening 191, having a sliding fit therein, and has its upper end provided with a head 193, which is adapted to seat in a complemental socket in the bottom of the matrix cavity 150ª and to coöperate with the surrounding portion of such cavity to shape the bottom of the molded article 166, as best shown in Figs. 17, 18 and 19. The stem 192 is normally held in lowered position, with its head 193 in seated position, by a coiled compression-spring 194, which encircles the stem within the socket 190, and has its inner and outer end thrusts against the inner end of such socket and a shoulder 195 on the lower end of the stem 192, respectively. The mold supporting table or bracket 152 is provided vertically therethrough in axial register with the stem 192, when the matrix mold 150 is seated thereon, with an opening 196, in which an ejecting-rod 197 is mounted. The rod 197 has a yoke 200 pivoted to its lower end, and pivotally connected to the arms of this yoke is the forked end of one arm of a bell-crank lever 201 (Figs. 3, 16, 17, 18, 19 and 26). The lever 201 is fulcrumed to the under side of the bracket 152 at the inner end portion thereof, as at 202, and has an arm 203 in contact with the ejector slide 204, which slide is mounted for horizontal reciprocatory movements in a suitable slideway 205 provided, in the present instance, between the lower spider 9 and the portion of the bracket 76 which seats thereon (Figs. 17, 18 and 19). The slide 204 is provided at the lever coacting end thereof with a stop shoulder 206 for coacting with the framework to limit the inward movements of the slide, and carries a roller 207 at its inner end for engagement with a cam-plate 208 (Figs. 19 and 24), which plate, in the present instance, is fixedly attached to the cam 89, thus making it stationary relative to the center column of the machine about which the units revolve. The cam plate 208, in the present instance, is located at substantially the opposite side of the center column to that at which the plunger moving portion of the cam-way 187 is disposed, as shown in diagram in Fig. 33. The engaging of the roller 207 by the ejecting-cam 208 causes an outward movement of the slide 204 sufficient to rock the lever 201 and impart an upward or ejecting movement to the ejector-rod 197, which in turn raises the ejecting stem 192 against the tension of the spring 194 to partially lift the molded article 163 from the matrix cavity, as shown in Fig. 19. When the ejector-cam 208 has moved from engagement with the roller 207, then the rod 197, lever 201 and slide 204 are returned to their normal position by the action of a coiled compression spring 209, which is interposed between the yoke 200 and the bottom of the mold supporting bracket 152.

*The reheating means.*—When the gathering mechanism has returned from the furnace with its gathering-cup filled with metal it is preferable to have the flame from a blow torch or burner play on the bottom side or exposed portion of the gathered metal to prevent a more rapid chilling of such exposed portion than the metal within the cup and also to melt any ridges, projections or uneven surfaces which are left on the under side of the metal by the cutting off mechanism. For this purpose the cam section 22 of the central column is provided in the top portion thereof without the vacuum-passage or conduit 117 therein with separate annular gas and air conduits 215 and 216, respectively. The gas and air conduits have supply pipes 217 and 218 leading thereto, respectively, from any suitable source of supply. The top of the gas supply conduit 215 is shown as having a restricted top portion 219, which opens without the column section 22 at the top thereof, and registering therewith are an annular series of ports 220 of slot form, in the present instance, which open into an annular passage 221 in the lower portion of the upper spider 24 (Figs. 4, 14, 30, 31 and 32). The annular passage 221 has a passage 222 leading therefrom for each unit of the machine (Figs. 14, 15 and 30), said passage being formed in a raised portion 223 at the central portion of the spider 24, and having communication at its outer end through a pipe 224 with the burner nozzle 225 of the associated unit, whereby to supply gas to such nozzle.

Compressed air within the supply conduit 16 is permitted to continuously enter an annular passage 226 in the spider through registering ports or passages 227 and 228 in the portions of the column section 22 and spider 24, which are disposed between the conduit 216 and passage 222 in a similar manner to that described for the ports or passages 219—220 leading from the gas conduit 215 (Figs. 4, 14, 30, 31 and 32). Leading from the annular passage 226 through a portion of the spider 24 for each unit of the machine is a passage 229, which has communication at its outer end through a pipe 230 with the associated burner nozzle 225, whereby to supply an air blast to said nozzle.

The nozzles 225 are secured to the outer peripheral portion of the upper spider 24, and each is disposed to direct its flame across the under side of the gathering-cup 97, when the gathering cup is in retracted or metal dropping position. It will be borne in mind that when the gathering mechanism of the ram is in its metal dropping position the ram-carriage stands at the limit of its rearward swinging movement relative to the spider frame and subsequently moves forward from such position to its normal inoperative position relative to the spider frame after the metal carried by its gathering mechanism has been dropped into the associated mold 150. It will thus be seen that the gas flame plays on the lower portion of the gathering-cup only when the gathering mechanism has returned from the pot and the ram-carriage is at its limit of rearward swinging movements relative to the spider frame.

*Operation of machine.*—In order that the operation of the machine may be more clearly understood a brief description of a cycle of operation of one unit of the machine will be given.

When the ram 36 of a unit moves into register with the working opening 5ª of the furnace, the rotary movement of the ram-carriage with the continuously rotating spider frame is arrested during the period required for the gathering mechanism to be run outward into the furnace, gather its metal and then return to its retracted position relative to the ram-carriage 28. The arresting of the movement of the ram-carriage at this point in the operation is caused by the roller 87 on the slide 83 entering the outwardly extending portion of the ram-carriage cam-way 88ª, the movement of the roller 87 in such portion of the cam-way imparting an outward movement to the ram-carriage slide 83. As this slide is moved outward the gearing connecting it with the rack 70 on the ram-carriage is actuated and swings the ram-carriage rearwardly relative to the spider frame at a speed equal to the speed of forward rotation of the spider frame, which results in the arresting of the movement of the ram-carriage relative to the furnace during the period of movement of a point on the spider frame from approximately a line *a* to a line *b* (Fig. 24). During the period of rest of the ram carriage 28, the roller 44 on the rack-bar 43, which is carried by said carriage, stands in the cam-way 46 in the ram dog-slide 45, and the cam-way 53 in the ram-slide cam-plate 33, which cam-way engages the roller 52 on the ram cam-slide 49, imparts a properly timed inward and outward movement to said slide and to the ram-dog slide 45, which is secured thereto by the ram-dog 50, thus moving the rack-bar 43 to and fro and communicating a consequent forward and return movement to the gathering ram 36. During the return movement of the ram 36 to its retracted position the cut-off knives 126 are operated to sever the surplus metal from the gathering-cup in position to permit such metal to drop into the furnace without the customary working ring thereof, or at any other point as may be desired. The cutting operation of the knives 126 is effected by the roller 134 on the lever 133, which is connected to such knives, traveling through inclined portions of the race-way 135 provided for such roller in a portion of the ram-carriage housing 37.

When the gathering-cup has returned to its retracted position from the furnace it stands in position for the flame from the associated burner 225 to play across its under side, whereby to heat the exposed portion of the metal carried by the gathering cup and melt any imperfections thereon. By reference to the cam diagram (Fig. 36) it will be noted that the mold moving cam-way 154 causes an outward movement of the mold raising slide 144 at approximately the same time that the ram-carriage swinging cam-way 88 effects an outward movement of the ram-carriage slide 82—83, so that the raising of the matrix mold 150 takes place during the rearward swinging of the ram carriage relative to the spider frame. It will be understood that the article molding mechanism and the ram-carriage normally stand out of vertical register and that the rearward swinging of the ram-carriage relative to the spider-frame brings the gathering mechanism in position for the gathering-cup thereof to axially register with the elevated mold 150 when such cup has returned from its gathering operation. The gathering mechanism and mold 150 now travel forward together with the spider frame, due to the rollers 153 and 87 of their respective control parts, traveling in the outwardly-disposed neutral portions 154ª and 88ᵇ of their respective cam-ways. When the gathering and molding mechanism have traveled in this manner a predetermined distance the roller 124 on the vacuum-valve controlling-lever 123 (Fig. 4) moves from engagement with the cam 125, thus permitting a closing of the vacuum-valve 119 and closing the communication between the gathering-cup 97 and the vacuum creating means, thus permitting the metal carried by the gathering-cup to drop into the elevated matrix mold 150. It will be understood that the vacuum-valve was opened at approximately the time of dipping of the gathering-cup into the metal in the furnace by reason of the roller 124 engaging the cam 125 at a suitable point for such purpose (Figs. 23 and 33). It is found that upon a closing of the vacuum valve 119 the leakage of air into the portion of the vacuum-passage disposed without the valve and in communication with the gathering-cup will be sufficient to overcome the vacuum action within such passage and release the metal from the cup. It will be apparent, however, that if desired, fluid pressure may be introduced into the ram passage 99 to assist in forcing the gathered metal from the cup 97 at the dropping point.

After the gathered metal has been dropped into the matrix mold 150 from the gathering cup the mold is lowered to its position on the table 152 and the ram-carriage is swung forward relative to the spider frame to assume its normal or original position, such movements of the mold and ram carriage being effected by the formation of their respective cam-ways 154 and 88, as best shown by the cam-way diagram in Fig. 36. When the mold 150 has returned to its lowered position in vertical register with the male-die 166 the roller 186, on the plunger-moving slide 143, enters the reëntrant portion 187$^a$ of its cam-way 187 and effects a lowering of the plungers 158 and 165 until the male-die 166 has partially moved into the matrix cavity 150$^a$ and had initial contact with the metal therein. The downward movement of the plungers is then caused to momentarily rest, due to the movement of the roller 186 into the neutral portion 187$^c$ of its cam-way, thus permitting the metal to partially flow in a natural manner around the die. The roller 186 then travels to the inner neutral portion 187$^d$ of the cam-way 187 and causes the die 126 to complete its article forming stroke, the traveling of the roller in the neutral portion 187$^d$ of the cam-way, causing the die to remain stationary for a short interval before returning to its raised inoperative position, which raising movement is accomplished by the roller 186 traveling outward in the cam portion 187$^b$ of the cam-way. It will be noted that the direct engaging of the plunger gear 177 with the die-carrying plunger 165 causes such plunger to have positive lowering and retracting movements communicated thereto from rocking movements of said gear, while the lowering movement of the pressure plate carrying plunger 158 is occasioned by reason of its yielding connection with the plunger 165 through the medium of the spring 170. When the pressure-plate 160, upon a lowering movement of the plungers, comes into engagement with the upper end of the matrix mold 150, the pressure-plate and its carrying parts are caused to remain stationary during the completion of the downward stroke of the die 166 and its carrying plunger 165 and during the first portion of the return stroke of said die and plunger. When the pressure-plate 160 seats upon the mold 150 the flange 162 of the plate fits closely into the recess 150$^b$ of the mold and overhangs the marginal portion of the mold cavity 150$^a$ a distance equal to the thickness of the upper edge portion of the article being formed, so that the plate and its flange coöperate with the upper cylindrical portion 166$^a$ of the die 166 to completely close the upper end of the matrix cavity when the die is at the limit of its forming stroke, as shown in Fig. 18. The machine unit now continues its travel around the axis of the machine with all of its operative parts in normal position, due to the rollers of the respective control parts traveling in the major neutral portions of the respective cam-ways. When the molding mechanism of the unit is, in the present instance, at substantially the opposite side of the machine axis to that at which the molding operation takes place, the roller 207 on the ejector-slide 204 engages the ejector-cam 208 and imparts ejecting movements to the lever 201 and ejector-rod 197. The ejecting or upward movement of the rod 197 raises the stem 192, which partially lifts the molded article 163 from the matrix mold. When the roller 207 has passed from engagement with the ejector cam 208 the ejecting parts are turned to their normal retracted positions by the springs 194 and 209.

It is evident that my machine may be provided with one, or any desired number, of operating units, and that the ram-slide cam-plate 33 should be geared to make as many revolutions to one revolution of the spider frame as there are units in the machine, providing of course such cam-plate has only one ram slide operating portion. If the machine is provided with six units, as in the present case, the ram-slide operating portion of the cam-way 53 is of too great a length for the cam-way 53 to be provided with six successive operating portions, and it is for this purpose that the cam plate is geared to rotate six times as rapidly as the spider frame.

It is to be understood that my invention does not reside in the construction and manner of operating the gathering mechanism of a unit, with the exception of the surplus metal cutting-off means thereof, as such construction in itself is not novel with me, but that the invention resides more particularly in the molding mechanism, and in its use in combination with the gathering mechanism, or with any of the features of such gathering mechanism. The means employed, in the present instance, for cutting off the surplus metal from the gathering-cup of the gathering-mechanism is considered to be novel, but no claim for the same separate from the other features of the machine is made therefor in this application, as the subject matter is covered by a copending application.

I wish it understood that the particular machine and the different parts thereof illustrated and described are merely a typical embodiment of one form of my invention, and that the specific construction described herein is merely by way of illustration and not by way of limitation or narrowing of my claims; as, obviously, a great many changes in construction and design can be made without departing from my invention, and, obviously also, various of the features described can be omitted, leaving the machine still operative to usefully do certain of the work described, and such changes are contemplated by me and would not involve any departure from my invention.

Having thus described my invention, what I claim as new, and desire to secure by Letters Patent, is,—

1. The combination with a gathering mechanism, of mechanical article-shaping mechanism disposed below said gathering mechanism having a matrix-mold swingingly movable from shaping position to receiving position with respect to the gathering mechanism, and vice versa, the mold being swingingly carried by parallel-link means to maintain the mold upright during its swinging movement.

2. The combination with a moving support, and a gathering mechanism carried by said support, of a shaping mechanism carried by said support below said gathering mechanism and having a vertically-swinging matrix-mold automatically movable from shaping position to receiving position above and outside of a portion of said shaping mechanism, and vice versa, and means forming a part of said shaping mechanism for maintaining the mold upright during its swinging movement.

3. The combination with a moving support, and a gathering mechanism carried by said support, of a matrix-mold movable with the support, a shaping die for coacting with said mold to shape an article and mechanism operable at a predetermined point in a moving of the support to move the matrix-mold to gathering position with respect to the gathering mechanism and then to move it to article shaping position, the mold when in its receiving position standing above and outside of said die.

4. The combination with a moving support, and a gathering mechanism carried thereby, of a matrix-mold movable with the support, a shaping plunger intermediate said gathering mechanism and mold and mechanism operable at predetermined points in a moving of the support to vertically swing the mold outward and upward relative to said plunger from shaping position to receiving position with respect to the gathering mechanism, and vice versa, and to retain the mold in upright position during its swinging movements.

5. In combination, a moving support, a gathering mechanism carried thereby and movable thereon, a matrix-mold movable with the support, a male die over said mold when in shaping position and separate automatic means simultaneously and periodically movable, one to arrest the movement of the gathering mechanism during a continuance of the movement of the support and the other to upwardly swing the mold relative to said die from shaping position to receiving position with respect to the gathering mechanism and to maintain the mold in upright position during its swinging movements.

6. In combination, a moving support, a gathering mechanism carried by said support for movement thereon, a male die below said mechanism a matrix-mold movable with the support and normally standing below said die and out of vertical register with the gathering portion of the gathering mechanism, automatic means for periodically arresting the movement of the gathering mechanism during a continuance of the movement of the support to bring the gathering mechanism and mold in vertical register, and automatic means operable to swing the mold up into receiving position with respect to the gathering mechanism when the movement of the gathering mechanism is arrested.

7. In combination, a moving support, a gathering mechanism carried thereby and movable thereon, automatic means periodically operable to arrest the movement of the gathering mechanism during a continuance of the movement of the support, a shaping mechanism having a matrix-mold and plunger normally in vertical register, and automatic means operable to move the mold to receiving position with respect to the gathering mechanism when the gathering mechanism is at the limit of its arresting movement relative to the support and to permanently maintain the mold in upright position, said operating means for arresting the movement of the gathering mechanism and for moving the mold to receiving position then being operated to cause said gathering mechanism and mold to remain in such positions with respect to the support a predetermined period and afterward to return to their normal positions with respect to the support.

8. In combination, a gathering mechanism, a matrix-mold, a male-die movable in one plane only with respect to said mold and disposed between said mechanism and mold, and automatic means periodically operable to vertically swing the mold upward from die-registering position to receiving position with respect to the gathering mechanism, and vice versa, and to maintain the mold in upright position during such movements.

9. In combination, a gathering mechanism, a shaping mechanism having a male pressing-die and a matrix-mold normally in register below said gathering mechanism, and means forming a part of said mechanism and periodically operable to move the mold upward outside of the pressing die from shaping position to receiving position with respect to the gathering mechanism, and vice versa.

10. In combination, a support, a gathering mechanism, an article-shaping mechanism carried by said support below the gathering mechanism and having a male-die movable in one plane relative to the support and a movable matrix-mold adapted when in one position of its movement to register with the die, and means forming a part of said mechanism and periodically operable to swing the mold upward outside of the male die from shaping position to receiving position with respect to the gathering mechanism, and vice versa.

11. In combination, a support, a gathering mechanism carried thereby, an article shaping mechanism carried by the support below the gathering mechanism and having a reciprocatory shaping-die and a movable matrix-mold, and means periodically operable to vertically swing the mold outward and upward from in register with said die to receiving position with respect to the gathering mechanism, and vice versa, and to maintain the matrix in upright position during such movements.

12. In combination, a support, a gathering mechanism, a periodically movable male article-shaping part carried by said support below said mechanism, and a matrix-mold movably mounted on a part of the support in register with said male part during its movements, and means periodically operable to move the mold outward and upward from the support to receiving position with respect to the gathering mechanism, and vice versa.

13. In combination, a support, a gathering mechanism carried thereby, a male-die and a matrix-mold mounted for different kinds of movements, said male die being intermediate the gathering mechanism and mold, and mechanism operable to periodically impart movements to the respective die and mold, the movements of the mold being such as to move it outward and upward from shaping position to receiving position with respect to the gathering mechanism, and vice versa.

14. The combination with a moving support, and a gathering mechanism carried by said support and periodically movable relative thereto and in the place of movement thereof, of a male article-shaping die movably carried by said support below the plane of movement of said mechanism, a movable matrix-mold in register with said die, and mechanism automatically operable when the gathering mechanism is in one position of its movement relative to said support to move the matrix mold outward and upward to receiving position with respect to the gathering mechanism and to subsequently return it to shaping position with respect to the die and to impart shaping movements to the die.

15. In combination, a moving support having a relatively fixed bearing head, a male-die carrying plunger movable in said head, a gathering mechanism carried by said support above normally out of vertical register with said plunger and periodically movable relative to the support into register with the plunger, a movable matrix mold below in register with the die carrying end of the plunger, and automatic mechanism operable to elevate said mold into receiving position with respect to the gathering mechanism when such mechanism is in register with said plunger and then to return the mold to plunger registering position and to impart article shaping movements to the plunger.

16. In combination, a moving support, a gathering mechanism carried thereby and movable thereon, means periodically operable to arrest the movement of the gathering mechanism during a continuance of the movement of said support, a bearing head fixedly carried by said support below said mechanism, a male-die carrying plunger mounted in said bearing head for reciprocatory movements in a plane intersecting the arresting movements of the gathering mechanism relative to the support, a matrix-mold normally standing below said plunger in the path of movement of its die, and mechanism automatically operable to swing the matrix-mold outward and upward to receiving position with respect to the gathering mechanism when said gathering mechanism is in arrested position and then to return the matrix-mold to normal position and impart shaping movements to the plunger.

17. The combination with a moving support, a gathering-ram movably carried thereby, and means periodically operable during a moving of said support to move the ram forward to gathering position and then to retract it to metal dropping position, of a shaping mechanism carried by said support below said ram and having a male shaping-die and a matrix-mold and periodically operable during a moving of said support to elevate the mold to receiving position with respect to said gathering ram, return it to forming position and then to impart shaping movements to the male-die.

18. In a glass working machine, the combination with a moving support, a glass gathering ram mounted for different kinds of movements relative to the support, means periodically operable during a moving of the support to arrest the movement of the ram with the support, and means operable during the arresting of the movement of the ram with the support to move the ram to and from gathering position, of a male article-shaping die carried by said support below the horizontal plane of the ram, a matrix-mold normally in register with said die, and mechanism automatically operable during an arresting of the movement of the ram with respect to said support to move the matrix mold outward and upward relative to the die to receiving position with respect to the ram, then to return it to normal position and to impart article-shaping movements to the male die.

19. In a glass working machine, a rotating support, a gathering ram carried thereby and movable in different planes relative thereto, means periodically operable during a rotating of the support to move the ram in one plane to arrest its movements, and means automatically operable during an arresting of the movements of the ram to move the ram into glass gathering position and then to return it to dropping position, of a male-die carried by said support below the horizontal plane of the ram for reciprocatory movements relative thereto, a movable matrix-mold, and control mechanism for the die and mold automatically operable to elevate the matrix-mold to receiving position during an arresting of the movement of the ram with respect to said support and then to return it to shaping position and to impart shaping movements to said die.

20. In combination, a moving support, a matrix mold carried thereby, a plunger carried by said support for movements toward and away from said mold and having a longitudinally extending series of rack-teeth, a die carried by said plunger, a pinion in mesh with the rack-teeth on said plunger, and mechanism periodically operable during and by a moving of the support to impart predetermined rocking movements to said pinion and consequent reciprocatory movements to the plunger to move its die into and out of the mold.

21. In a machine of the class described, a moving support, a matrix-mold and a male die movable therewith, a rock-shaft journaled in a part of said support, a link fixed to said shaft and pivotally connected at its free end to said mold, a second link pivotally connected at one end to the mold and at its other end to said support and cooperating with said first link to maintain the mold in upright position when vertically swung, and means periodically operable during a moving of the support to impart predetermined rocking movements to said shaft and swinging movements to said mold outside of and above said die, and vice versa.

22. In a machine of the class described, a moving support, a male-die movably carried thereby, a gathering device disposed over said die, a matrix-mold movable with the support below said die in register therewith, means periodically operable to reciprocate said male-die during a moving of the support, and means periodically operable to swing the matrix mold upward at the outer side of the die to a point above the horizontal plane of the die and adjacent to said gathering device during a moving of the support, said mold swinging means having parts which straddle the die during a portion of the swinging movements of the mold.

23. In a machine of the class described, a moving support, a male die carried thereby and vertically movable relative thereto, a gathering device disposed over the plane of said die, a matrix mold movable with the support, means periodically operable to impart reciprocatory movements to the male-die during a moving of the support, a double pair of links with the members of each pair horizontally spaced and pivoted at one end to the matrix mold at opposite sides thereof and at the other end to said support at a point above the mold, said links coöperating to cause the mold to stand in upright position when being vertically swung and being adapted to straddle the male die during portions of the swinging movements of the mold, and means periodically operable during a moving of the support to move said links to impart predetermined swinging movements to the mold to move it into and out of receiving position with respect to said gathering device.

24. In a machine of the class described, in combination, a gathering mechanism, an article shaping mechanism having coöperating male and matrix-mold shaping parts disposed under said gathering mechanism, and mechanism operable during a cycle of operations of the machine to actuate the gathering mechanism to gather metal and to return to dropping position, to actuate the matrix mold to move upward from shaping position to receiving position with respect to the gathering mechanism, and vice versa, and to operate the male die to coöperate with the mold to shape an article therein.

25. In a machine of the class described, in combination, a moving support, a gathering mechanism carried by said support and having a movable gathering part, a shaping mechanism carried by said support below the gathering mechanism and having male and female shaping parts each movable relative to the support, and mechanism operable during a cycle of operations of the machine to move said gathering part from dropping position to gathering position and vice versa, to elevate the female-die from shaping position to receiving position with respect to said gathering part and relative to the male-die, and vice versa, and to impart article shaping movements to the male-die when the female-die is in register therewith, the moving of the gathering part and of the female-die being timed to take place at substantially the same period and the moving of the male-die being subsequent to the moving of the female-die to receiving position.

26. In a machine of the class described, a rotating support, a working unit carried by said support and comprising a gathering mechanism and a shaping mechanism, the shaping mechanism having differentially movable male and female shaping parts disposed below the gathering mechanism, mechanism periodically operable during a moving of the support to operate the gathering mechanism to gather a predetermined quantity of metal, and mechanism operable during a moving of the support to elevate the female-die from shaping to receiving position with respect to the gathering mechanism and then to return it to shaping position and to move the male-die to coöperate with the female-die to shape an article, the movements of the gathering mechanism and of the female-die being timed to take place at approximately the same time in a cycle of operations of the unit, and the shaping movements of the male-die being timed to take place subsequently to the movements of the female-die.

27. In a machine of the class described, in combination, a rotating support, a gathering mechanism and a shaping mechanism carried thereby, said shaping mechanism having male and female shaping parts disposed below said gathering mechanism and capable of relative differential movements, mechanism periodically operable during a rotating of the support to actuate the gathering mechanism to gather a quantity of metal and return to metal dropping position, mechanism periodically operable during a rotating of the support to elevate the female-die from shaping position to receiving position relative to the gathering mechanism, and vice versa, and to impart shaping movements to the male-die, the movements of the female-die being timed to take place approximately at the time of moving of the gathering mechanism, and the moving of the male-die being timed to take place subsequently to the moving of the female-die, and mechanism operable at a different point in a cycle of operations from the points of moving of the gathering mechanism and shaping mechanism to effect a release of a shaped article from the female-die.

28. In a machine of the class described, in combination, a rotating support, a gathering mechanism and a shaping mechanism carried thereby, said shaping mechanism having male and female shaping parts disposed below said gathering mechanism and capable of relative differential movements, mechanism periodically operable during a rotating of the support to actuate the gathering mechanism to gather a quantity of metal and return to metal dropping position, mechanism periodically operable during a rotating of the support to elevate the female-die from shaping position to receiving position relative to the gathering mechanism, and vice versa, and to impart shaping movements to the male-die, the movements of the female-die being timed to take place approximately at the time of moving of the gathering mechanism, and the moving of the male-die being timed to take place subsequently to the moving of the female-die, and mechanism operable at a different point in a cycle of operations from the points of moving of the gathering mechanism and shaping mechanism parts to effect a release of a shaped article from the female-die.

29. In a machine of the class described, a moving support, a shaping mechanism carried thereby and comprising a matrix-mold and a movable male-die for coöperating with said mold in shaping an article, and mechanism operable during a moving of the support to move said die into and out of the mold to coöperate therewith to shape an article and to effect a positive arresting of the shaping movements of the die between its point of entering the mold and the completion of its stroke.

30. In a machine of the class described, a shaping mechanism comprising a matrix mold and a movable male die for coöperating with said mold in shaping an article, and means operable to move said die into and out of the mold and to cause the movement of the die into the mold to be positively arrested at a predetermined point between its point of entering the mold and the completion of its stroke.

31. In a mechanism of the class described, a movable support having a slide way, a slide movable in said way and having rack teeth, a shaft journaled to said support, a pinion carried by said shaft in mesh with said rack teeth, arms projecting outwardly and downwardly from said shaft, a mold carried by said arms for swinging movements therewith, means connecting said mold and a part of said support to maintain the mold in upright position when being swung, and means automatically operable during movements of said support to impart predetermined movements to said slide.

32. In a mechanism of the class described, a movable support having a pair of slide ways, one above the other, a slide movable in each slide way and one slide having rack teeth, a bracket rising from said support and having a vertical bearing head at its outer end, a plunger reciprocally movable in said head and having a vertical series of rack teeth extending lengthwise thereof, rock shafts carried by said bracket, pinions mounted on said shafts and having respective engagement with the rack teeth on said slide and plunger, connection between the pinion having engagement with said plunger and the slide which has no rack teeth, a mold normally resting on the support below said plunger and arms connecting said mold with the rock shaft having connection with said slide whereby the mold is swung outwardly and forward to receiving position relative to said plunger and vice versa when said rack slide is moved, and means for imparting predetermined reciprocatory movements to said slides when said support is moved.

In testimony whereof, I have hereunto signed my name to this specification in the presence of two subscribing witnesses.

JOSEPH W. ROBINSON.

Witnesses:
P. D. WAGNER,
F. E. AUL.